US006865893B2

(12) United States Patent
Koganezawa et al.

(10) Patent No.: US 6,865,893 B2
(45) Date of Patent: Mar. 15, 2005

(54) PRODUCTION PROCESS OF GAS TURBINE

(75) Inventors: Tomomi Koganezawa, Hitachi (JP); Takanori Shibata, Hitachinaka (JP); Nobuhiro Seiki, Hitachi (JP); Shinya Marushima, Hitachinaka (JP); Shinichi Higuchi, Hitachinaka (JP); Nobuaki Kizuka, Hitachinaka (JP); Ryou Akiyama, Hitachinaka (JP); Masami Noda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 55 days.

(21) Appl. No.: 10/602,686

(22) Filed: Jun. 25, 2003

(65) Prior Publication Data

US 2004/0060296 A1 Apr. 1, 2004

(30) Foreign Application Priority Data

Jun. 25, 2002 (JP) ...................................... 2002-183797
May 30, 2003 (JP) ...................................... 2003-153681

(51) Int. Cl.$^7$ ................................................ F02C 6/00
(52) U.S. Cl. ...................................... 60/801; 29/889.21
(58) Field of Search ........................... 60/801; 415/921; 29/889.2, 888.011, 889.21

(56) References Cited

U.S. PATENT DOCUMENTS 6,438,837 B1 * 8/2002 Berry et al. .................. 29/889

FOREIGN PATENT DOCUMENTS

JP          11-229894       8/1999
WO          WO98/48159      10/1998

OTHER PUBLICATIONS

Aviation Week and Space Technology, Jan. 13, 1997, pp. 104, 114.*
GE brochure for LM6000, date unknown.*
P&W brochure for FT8, date unknown.*
"Gas Turbine Cycle, Combined Cycle, Reheat Gas Turbine, Cogeneration, STIG System, Repowering, HAT Cycle, CO Recovery Turbine, WE–NET Project, CAES System", Journal of Gas Turbine Society of Japan, vol. 25, No. 97, 1997.
"Upgrading of a Small Size Gas Turbine to Hat Cycle Operation Thermodynamic and Economic Analysis", Umberto Desideri and Francesco di Maria, ASME Paper 99–GT–372, 1999.

* cited by examiner

*Primary Examiner*—Ehud Gartenberg
(74) *Attorney, Agent, or Firm*—Mattingly, Stanger, Malur & Brundidge, P.C.

(57) ABSTRACT

A production process of a gas turbine capable of being applied to various cycles. A principal part of a gas turbine is initially set based on roughly set conditions, and the number of stages of the compressor and of the turbine for a desired cycle are set for the principal part. The compressor and the turbine each having the set number of stages and included in the principal part are combined to construct the gas turbine. When the set number of stages of the compressor or the turbine differs for a different desired cycle, a disk-shaped member having an outer periphery, which forms an inner peripheral wall of the annular flow passage of the compressor or the turbine, is assembled into the principal part having a smaller number of stages so that the bearing-to-bearing distance is kept constant.

4 Claims, 21 Drawing Sheets

DUMMY DISC

DUMMY KEY

FIG.14

| | COMBUSTION TEMPERATURE (°C) | PRESSURE RATIO | CYCLE |
|---|---|---|---|
| COMPRESSOR AIR FOIL | — | 23 | SIMPLE |
| COMPRESSOR ROTOR | — | 23 | SIMPLE |
| TURBINE AIR FOIL | 1250 | 23 | SIMPLE |
| TURBINE ROTOR | 1450 | — | COMBINED/MOISTURE UTILIZING GAS TURBINE CYCLE |
| CASING | 1250 | 23 | SIMPLE |

FIG.15

| | COMBUSTION TEMPERATURE (°C) | PRESSURE RATIO |
|---|---|---|
| COMPRESSOR AIR FOIL | — | 23/23 |
| COMPRESSOR ROTOR | — | 23/23 |
| TURBINE AIR FOIL | 1250/1250 | 23/23 |
| TURBINE ROTOR | 1250/1450 | — |
| CASING | 1250/1250 | 23/23 |

FIG.16

|  | COMBUSTION TEMPERATURE (°C) | PRESSURE RATIO |
|---|---|---|
| COMPRESSOR AIR FOIL | — | 20/23 |
| COMPRESSOR ROTOR | — | 20/23 |
| TURBINE AIR FOIL | 1450/1250 | 20/23 |
| TURBINE ROTOR | 1450/1450 | — |
| CASING | 1450/1250 | 20/23 |

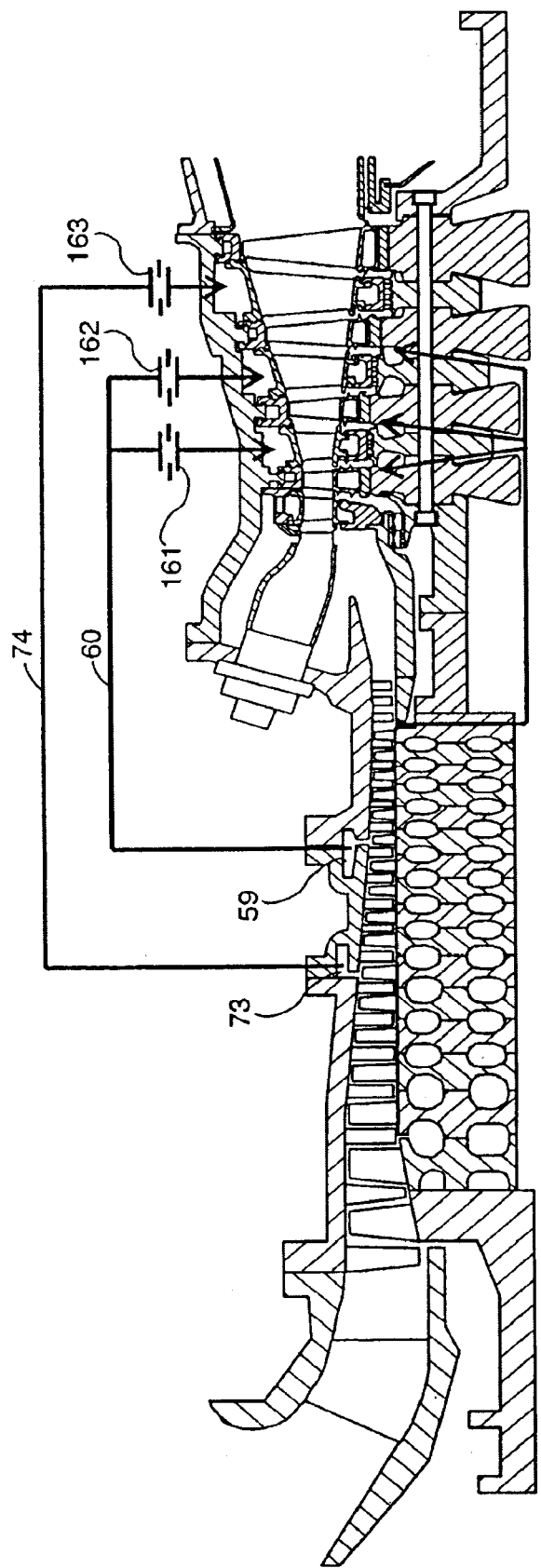

PRODUCTION PROCESS OF GAS TURBINE

BACKGROUND OF THE INVENTION

1. Field of the Invention

The present invention relates to a production process of a gas turbine for use in various types of gas turbine systems.

2. Description of the Related Art

The exhaust temperature of a gas turbine is as high as about 500° C. As described in, e.g., Journal of Gas Turbine Society of Japan, Vol. 25, No. 97 (1997), therefore, a gas turbine is operated in various cycles, i.e., a combined cycle, a cogeneration cycle, a regenerative cycle, and a high-moisture gas turbine cycle, so as to achieve higher efficiency than that in a simple cycle. In some of those various cycles, the efficiency of an overall system is increased by reducing a pressure ratio from a value at a maximum efficiency point in the simple cycle to raise the exhaust temperature, or by increasing the turbine inlet temperature to raise the exhaust temperature.

Also, in a high-moisture gas turbine cycle disclosed in, e.g., PCT Laid-Open Publication No. WO98/48159, because a turbine is driven with air delivered from a compressor and mixed with moisture, a ratio of turbine capacity to compressor capacity is increased in comparison with those in the other cycles. This necessitates development of a gas turbine dedicated for the high-moisture gas turbine cycle separately from a gas turbine for the simple cycle. Alternatively, as described in a paper (Upgrading of a Small Size Gas Turbine to HAT Cycle Operation: Thermodynamic and Economic Analysis, Umberto Desired and Francisco did Maria, SAME Paper 99-AT-372, 1999), it is required to constitute the high-moisture gas turbine cycle by combining a compressor used in a relatively small-sized gas turbine and a turbine used in a relatively large-sized gas turbine. Alternatively, as disclosed in Japanese Unexamined Patent Application Publication No. 11-229894, it is required to provide a variable stat or vane in a part of a compressor or a turbine so that matching is held between the compressor and the turbine in each of the simple cycle and the high-moisture gas turbine cycle.

SUMMARY OF THE INVENTION

Thus, even in a gas turbine operated under equal conditions of flow rate, temperature and pressure, an optimum compression ratio and optimum flow rates through a compressor and a turbine change for each of various cycles, and hence there is necessity of designing the compressor and the turbine suitable for each of the cycles. However, design and production of the compressor and the turbine suitable for each of the cycles pushes up the cost and increases the number of parts to be used under management.

It is an object of the present invention to provide a production process of a gas turbine capable of being applied to various cycles.

To achieve the above object, according to the present invention, a principal part of a gas turbine is set in advance based on roughly set conditions (e.g., temperature and flow rate at a turbine inlet), and the number of stages of a compressor and the number of stages of a turbine, which can provide conditions (e.g., turbine outlet temperature) suitable for a desired cycle, are set based on the set principal part. The compressor and the turbine each having the set number of stages and included in the principal part are combined with each other to construct a gas turbine.

BRIEF DESCRIPTION OF THE DRAWINGS

FIG. 14 is a table in the case of setting a value of at least one of combustion temperature and pressure ratio suitable for common elements;

FIG. 15 is a table in which parameter setting values of the common elements designed in advance are compared with parameter values of the common elements in the simple cycle;

FIG. 16 is a table in which parameter setting values of the common elements designed in advance are compared with parameter values of the common elements in the combined cycle and the high-moisture gas turbine cycle;

FIG. 25 shows a cooling system for a casing; and

DESCRIPTION OF THE PREFERRED EMBODIMENTS

A first embodiment of the present invention will be described below with reference to FIGS. 1 to 9.

Figure 2:
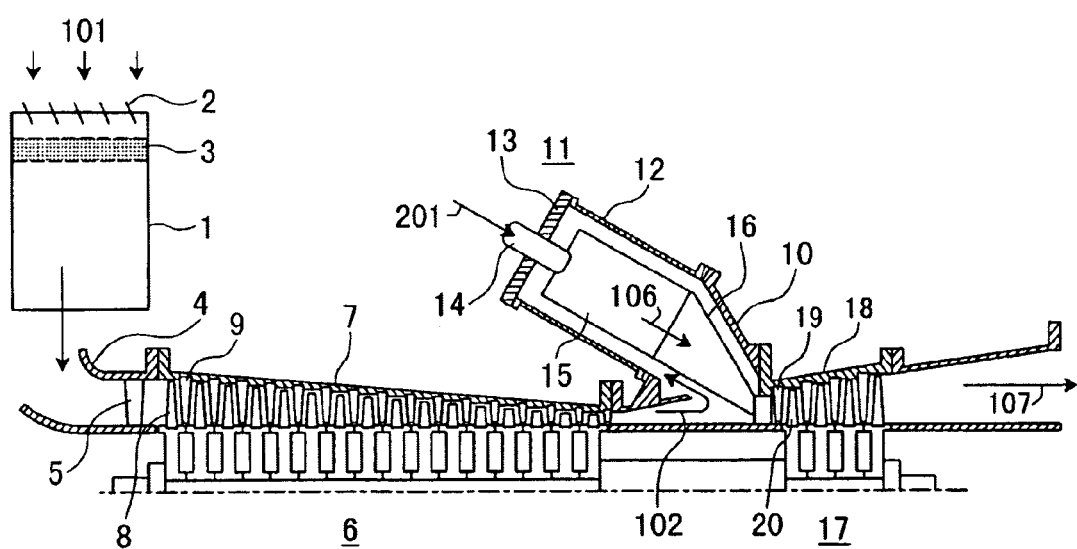
FIG. 2 shows a gas turbine for a simple cycle.

FIG. 2 represents the first embodiment of the present invention and is a schematic view showing a simple gas turbine cycle with a gas turbine having a preset principal part. Air 101 is sucked through a louver 2 at an inlet of an intake chamber 1. After being cleaned through a filter 3, the air passes an inlet guide vane 5 provided in an intake outer casing 4 and is compressed by a compressor 6. The compressor 6 shown in FIG. 2 is, e.g., a 16-stage compressor including sixteen pairs of moving blades 8 and stat or blades 9, which are disposed within a compressor outer casing 7. The compressor 6 is designed so as to provide a pressure ratio optimum for the simple gas turbine cycle. Downstream fourteen of the total sixteen stages are designed so as to provide a flow rate and a pressure ratio optimum for the operation in a high-moisture gas turbine cycle described later. Also, upstream fourteen of the total sixteen stages are designed so as to provide a pressure ratio optimum for the operation in a combined cycle and a co generation cycle both described later.

High-pressure air 102 compressed by the compressor flows into a combustion 11 through a body outer casing 10. The combustion 11 comprises an outer casing 12, a cover 13, a fuel nozzle 14, a liner 15, a transition piece 16, etc. The high-pressure air 102 having flown into the combustion 11 flows toward a head portion of the combustion 11 while cooling the combustion transition piece 16 and the combustion liner 15, and then flows into the combustion liner 15 through an opening formed in the combustion liner 15. Subsequently, the high-pressure air 102 mixes with fuel 201 injected through the fuel nozzle 14 and becomes high-temperature combustion gas 106 after combustion. The combustion gas 106 is introduced to a turbine 17 while passing the combustion liner 15 and the combustion transition piece 16.

The turbine 17 shown in FIG. 2 is, e.g., a 4-stage turbine including four pairs of turbine nozzles 19 and turbine buckets 20, which are disposed within a turbine outer casing 18. The turbine 17 is designed so as to provide an expansion ratio optimum for the simple gas turbine cycle. Upstream two of the total four stages are designed so as to provide a load and an expansion ratio optimum for the operation as a two-shaft gas turbine described later. Also, upstream three of the total four stages are designed so as to provide an expansion ratio optimum for the operation in the combined cycle, the cogeneration cycle, and a regenerative cycle described later. The pressure and temperature of the combustion gas 106 are reduced with expansion while passing the nozzles and the buckets of the turbine 17, and resulting turbine exhaust gas 107 is discharged.

Figure 6:
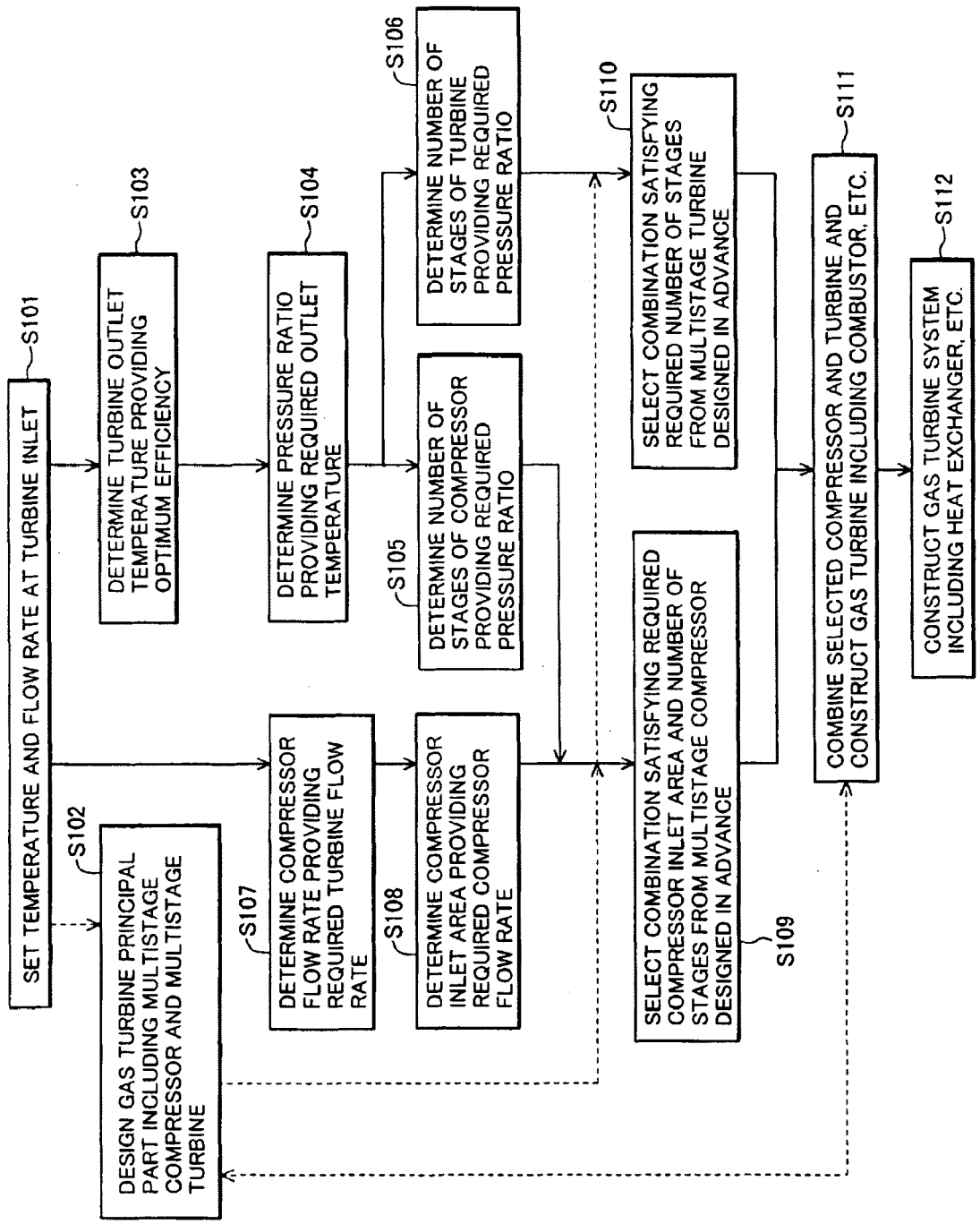
FIG. 6 is a flowchart for setting the number of stages according to the first embodiment of the present invention.

FIG. 6 is a flowchart showing a production process of a gas turbine operated in various cycles and including, as a principal part, the simple cycle gas turbine described above, in particular, the stages of the compressor, the combustor liner, the combustor transition piece, the turbine nozzles and buckets, etc. A description is here made of the case in which, based on setting conditions (step 101 or S101) given as temperature and flow rate at a turbine inlet, the number of stages in each of the compressor and the turbine is designed so that a proper temperature condition at a turbine outlet is provided in each of the various cycles.

Consider now, for example, a high-moisture cycle gas turbine described later in more detail. First, a gas turbine principal part including a multistage compressor and a multistage turbine is designed (step 102). Then, a turbine outlet temperature providing optimum efficiency is determined through cycle calculations (step 103). In the high-moisture gas turbine cycle, after humidifying air delivered from the compressor, the humidified air is recuperated with exhaust gas from the turbine outlet for use in combustion. At a higher turbine outlet temperature, therefore, the temperature of combustion air is increased, which makes it possible to reduce the amount of fuel and improve the efficiency of the gas turbine if the turbine inlet temperature is the same. Although an upper limit of the turbine outlet temperature is restricted by the heat-resistant condition of a recuperate, etc., the optimum turbine outlet temperature in the high-moisture gas turbine cycle is higher than that in the simple cycle.

Next, a pressure ratio required to provide the optimum turbine outlet temperature is determined (step 104). If the turbine inlet temperature is substantially the same, the turbine outlet temperature is increased at a smaller pressure ratio. Accordingly, the pressure ratio in the high-moisture gas turbine cycle is smaller than that in the simple cycle. Then, the number of stages in each of the compressor and the turbine, which provides the required pressure ratio, is determined (step 105 and 106).

In parallel to the setting of the number of stages, a compressor flow rate required to provide the set flow rate at the turbine inlet is set (step 107). In the high-moisture gas turbine cycle, because moisture is added to the air delivered from the compressor, the turbine flow rate is larger than the compressor flow rate and is about 1.2 times in some example. Therefore, the required compressor flow rate is determined from the set amount of added moisture, and an inlet area of the compressor, which provides the required compressor flow rate, is calculated using the corrected mass flow rate (step 108). If the flow rate at the turbine inlet is substantially the same, the compressor flow rate in the high-moisture turbine cycle is smaller than that in the simple cycle as described above, and hence the inlet area of the compressor is also reduced correspondingly.

Based on the setting results described above, a combination satisfying the determined number of stages and inlet area of the compressor is selected from the multistage compressor for the simple cycle designed in advance (step 109). Because the pressure ratio and the compressor flow rate in the high-moisture gas turbine cycle are both smaller than those in the simple cycle, a downstream part of the multistage compressor for the simple cycle is selected as described later in more detail. Similarly, a proper turbine combination is selected (step 110). A gas turbine is constructed by combining the selected compressor and turbine with a combustor, etc. (step 111). Finally, a high-moisture gas turbine system including a humidifier, a recuperate, a heat exchanger, etc. is constructed (step 112).

While the above description has been made of the high-moisture gas turbine cycle, a gas turbine system for each of the combined cycle, the cogeneration cycle, the regenerative cycle, etc. can be constructed in a similar manner. Further, while the temperature and the flow rate at the turbine inlet are employed as the setting conditions in this embodiment, the flow rates, pressures, temperatures, etc. of the compressor, the combustor and the turbine can also be additionally set. Moreover, it is possible to include a bearing and an outer casing, as common elements, in the principal part of the gas turbine.

Figure 7:
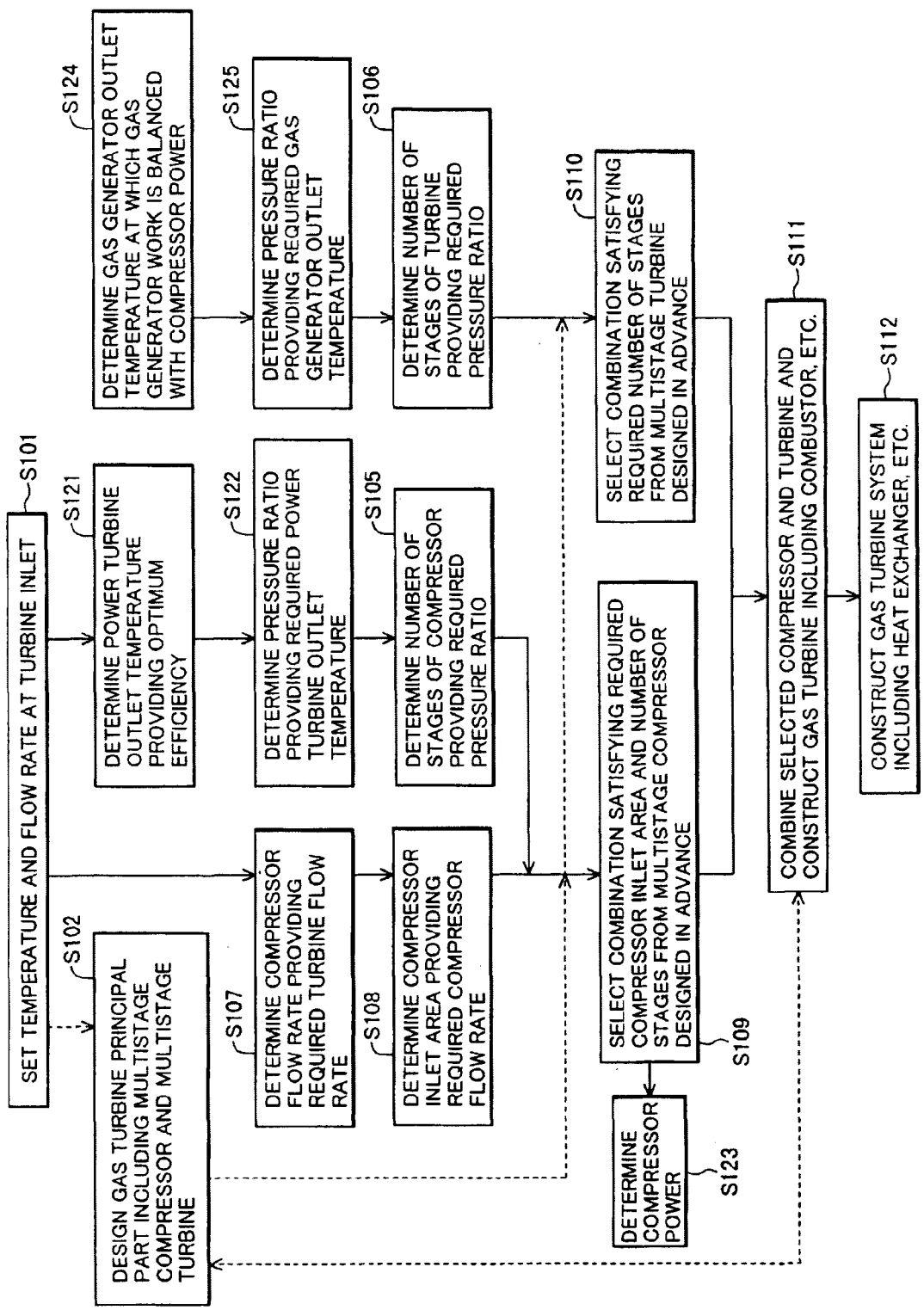
FIG. 7 is a flowchart for setting the number of stages of a two-shaft gas turbine according to the first embodiment of the present invention.

The case of applying a similar process to a two-shaft gas turbine will be described below with reference to FIG. 7. In the case of a two-shaft gas turbine, the number of stages of a compressor can be selected in the same manner as that described above. More specifically, a power turbine outlet temperature providing optimum efficiency is determined (step 121). A pressure ratio providing the required power turbine outlet temperature is determined (step 122), and the number of stages of the compressor providing the required pressure ratio is determined (step 105). Then, a combination satisfying the determined number of stages and inlet area of the compressor is selected from the multistage compressor designed in advance (step 109). As a result, compressor power is determined (step 123).

In a gas generator, the outlet temperature of the gas generator is selected so that gas generator work is balanced with the compressor power (step 124). Then, in the same manner as that described above, a pressure ratio providing the required gas generator outlet temperature is determined (step 125), and the number of stages of the gas generator providing the required pressure ratio is determined (step 106). Because the number of stages of the turbine is smaller than that of the compressor, work distribution is preferably set for easier utilization by the two-shaft turbine when the turbine of the simple cycle gas turbine is designed. Similarly, each stage of the compressor is also preferably set for easier utilization in the desired cycle when the compressor of the simple cycle gas turbine is designed.

The various cycles constructed according to the above-described process will be described, by way of example, below.

Figure 1:
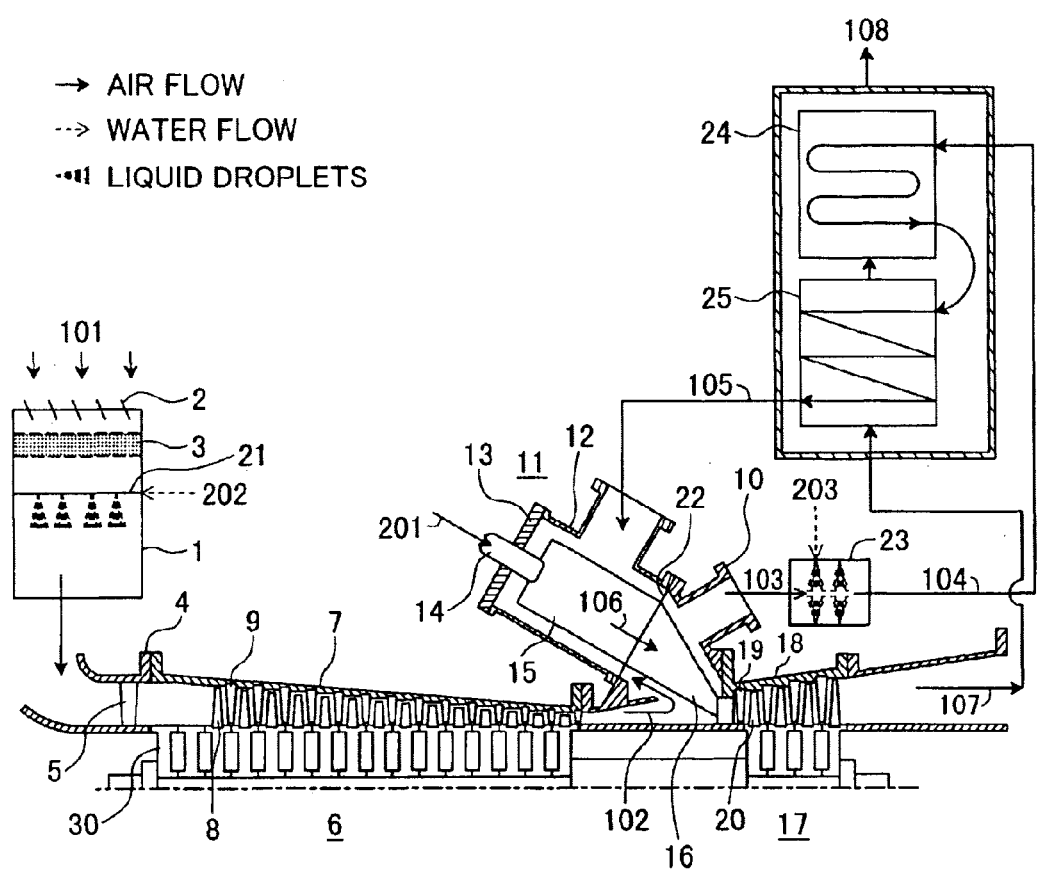
FIG. 1 shows a high-moisture gas turbine according to a first embodiment of the present invention.

FIG. 1 is a schematic view showing the high-moisture gas turbine cycle. The following description is made of portions different from those in the simple cycle described above. Air 101 is cleaned through a filter 3, and then water 202 is sprayed from an intake humidifier 21 disposed in an intake chamber 1. As a result, the humidity of the air 101 is increased and, at the same time, the temperature of the air 101 is reduced. With the effect of increasing a compressor suction flow rate and the effect of reducing compressor power, therefore, the gas turbine output and the gas turbine efficiency are both increased. A compressor 6 has 14 units, i.e., 14 stages, for each of moving and stator blades, which are smaller than the number of stages in the simple cycle described above. The reduction in the number of stages functions to reduce the system pressure ratio in comparison with that in the simple cycle. In the high-moisture gas turbine cycle, the number of stages is reduced by omitting two upstream stages of the compressor relative to the simple cycle.

With the reduction in the number of stages, the compressor suction flow rate is reduced for offset with an increase in the amount of water sprayed into the high-pressure air, whereby the flow rate of the air flowing into the turbine can be held constant or slightly reduced. Accordingly, a modification of the turbine upstream stages, which have a difficulty in development thereof, is no longer required. Also, since the fourteen downstream stages are constructed of the same parts as those used in the simple cycle, the compressor bladed can be developed in common even when two types of gas turbine systems adapted for the simple cycle and the high-moisture gas turbine cycle are constructed.

Figure 8:
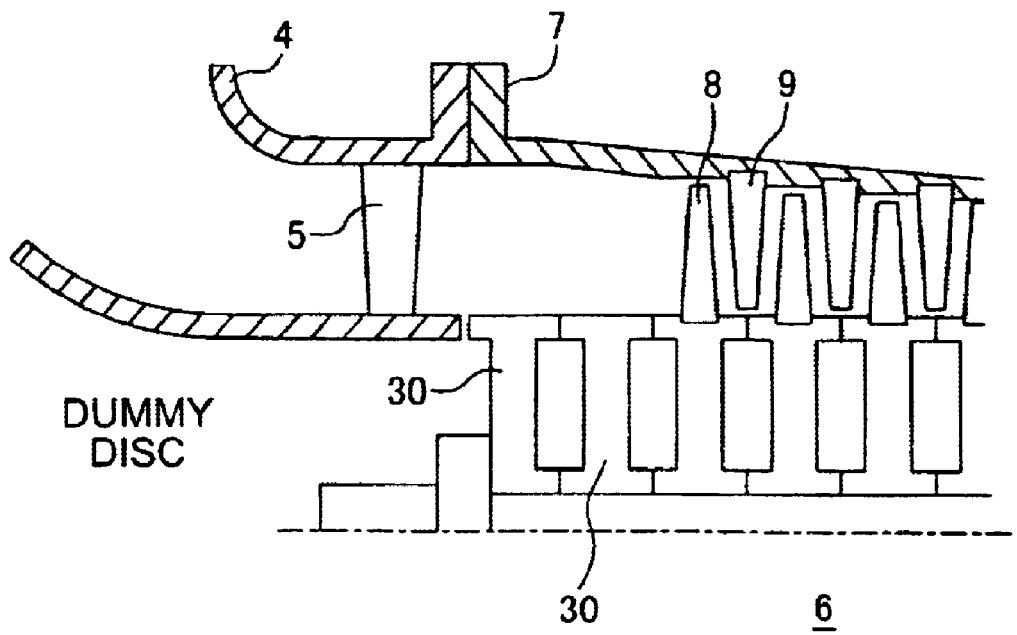
FIG. 8 shows an example of a dummy disk.
Figure 9:
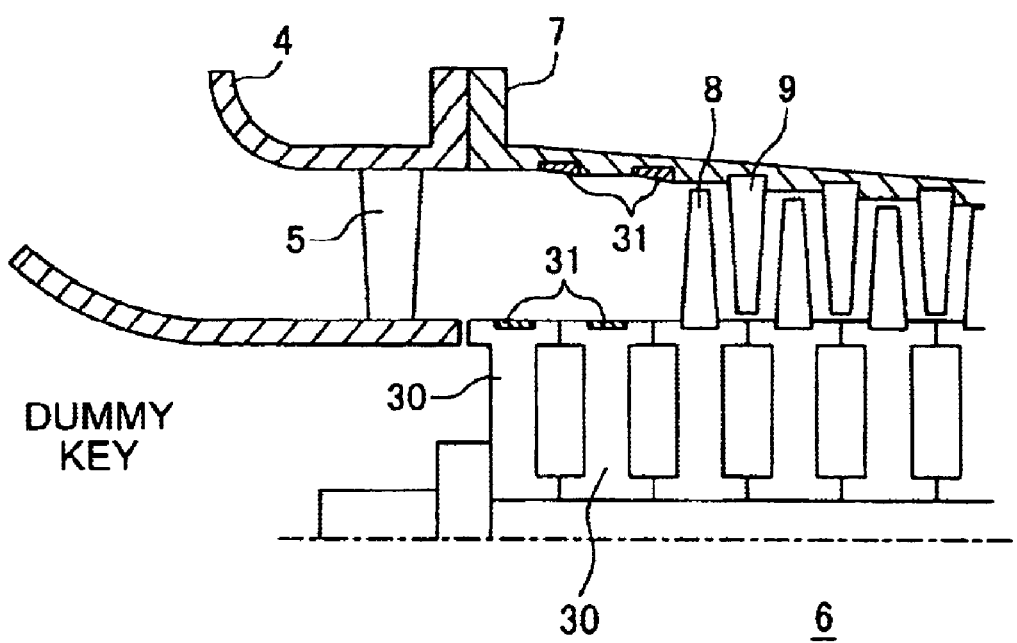
FIG. 9 shows an example of a dummy key.

Further, when reducing the number of stages by omitting two upstream stages, a substantially disk-shaped member having an outer periphery, which serves as a part of an inner peripheral wall of a substantially annular flow passage of the compressor or the turbine, is inserted in each of disk mount positions of the omitted stages. For example, as shown in FIG. 8, by inserting dummy disks 30 provided with neither compressor blades nor blade mount grooves (i.e., having an outer peripheral surface formed smooth) in the disk mount positions of the two omitted stages, the bearing-to-bearing distance can be held constant in the gas turbines operated in the various cycles and the rotor length can be kept the same as that in the simple cycle. As a result, structural modifications of an intake outer casing 4, a compressor outer casing 7, bearings, and stacking bolts (latter two not shown) are no longer required, whereby the design period can be cut down and the relevant parts can be used in common. While the dummy disk 30 can be given as a member having a smooth outer periphery as shown in FIG. 8, it may also have the compressor blade mount groove employed in common with the simple cycle, as shown in FIG. 9. In the latter case, preferably, a dummy key 31 is fitted to the blade mount groove, as shown in FIG. 9, so as to provide a structure in which the flow passage in the compressor has a smooth shape and a pressure loss is reduced. With the use of the dummy key 31, when changing the mode of operating the gas turbine from the high-moisture gas turbine cycle to the simple cycle, the change can be easily realized just by removing the dummy key and inserting the compressor blade instead.

The high-pressure air 102 having been compressed by the compressor 6 and having flown into the combustor 11 flows through a body outer casing 10 while cooling a combustor transition piece 16, and is extracted through an extraction port formed in the body outer casing 10. At this time, the air cooling the combustor transition piece 16 has a lower temperature and a higher humidity, and hence the cooling effect is increased. Also, a seal plate 22 is disposed between the body outer casing 10 and the combustor outer casing 12 to prevent the air before recuperation from mixing with the air after recuperation and to maintain a high recuperation effect. Thereafter, water 203 is sprayed from a high-pressure humidifier 23 to further increase the humidity and lower the temperature. The air is then subjected to heat exchange with turbine exhaust gas 107 in a low-temperature recuperate 24 for an increase in the air temperature, whereupon all of the sprayed water 203 evaporates. At this time, since the air before recuperation has a lower temperature and a higher humidity, the recuperation effect is increased. Subsequently, the air is further subjected to heat exchange with the turbine exhaust gas 107 at a higher temperature in a high-temperature recuperate 25 for an additional increase in the air temperature, and then flows into the combustor 11 through an injection port of the combustor outer casing. On this occasion, since all of the sprayed water 203 has evaporated in the low-temperature recuperate 24, neither erosion nor deposition of impurities occurs in the high-temperature recuperate 25 and reliability of the high-temperature recuperate 25 is improved.

While the high-temperature and high-moisture air is used for combustor as in the simple cycle gas turbine, the air contains a large amount of moisture. Accordingly, the flame temperature locally lowers and the amount of nitrogen oxides produced during the combustion can be reduced to a large extent.

A turbine 17 has four stages similarly to that for the simple cycle. Taking into account the above-described reduction in the compressor flow rate, however, the turbine 17 is designed so as to have a somewhat smaller turbine flow rate. Correspondingly, the pressure and the expansion ratio are both reduced, whereby the pressure ratio in the system is reduced with the above-described reduction in the number of stages of the compressor and hence the temperature of the turbine exhaust gas 107 is increased. As a result, the temperature of high-temperature and high-moisture air 105 is also increased. This means that, if the temperature of combustion gas 106 is the same, the amount of fuel 201 can be cut down and the gas turbine efficiency can be improved. While in this embodiment the pressure ratio is reduced by decreasing the turbine inflow rate, the pressure ratio may be reduced by slightly reducing the mount angle of the turbine stat or blade and increasing the opening area. In the latter case, although the turbine shape must be somewhat modified, the turbine flow rate can be increased and hence the cycle output can be increased.

Thus, in the high-moisture gas turbine, the efficiency can be improved with an increase in the temperature of the turbine exhaust gas. It is possible to increase the temperature of the turbine exhaust gas by a method of reducing the pressure ratio as described above, or a method of reducing the temperature of the combustion gas. With the method of reducing the pressure ratio employed in this embodiment, since the temperature of the combustion gas can be held constant, modifications of the combustor liner, the combustor transition piece, and the turbine stat or and moving blades in the upstream stages, which have a difficulty in development thereof, are no longer required.

The turbine exhaust gas 107 successively flows into the high-temperature recuperate 25 and the low-temperature recuperate 24. After lowering of the temperature through heat exchange with the high-moisture air 104, the turbine exhaust gas 107 turns to low-temperature turbine exhaust gas 108, which is then discharged. Because the final exhaust gas temperature is lower than that in the simple cycle, thermal energy is more effectively utilized and the turbine efficiency is improved correspondingly.

Figure 3:
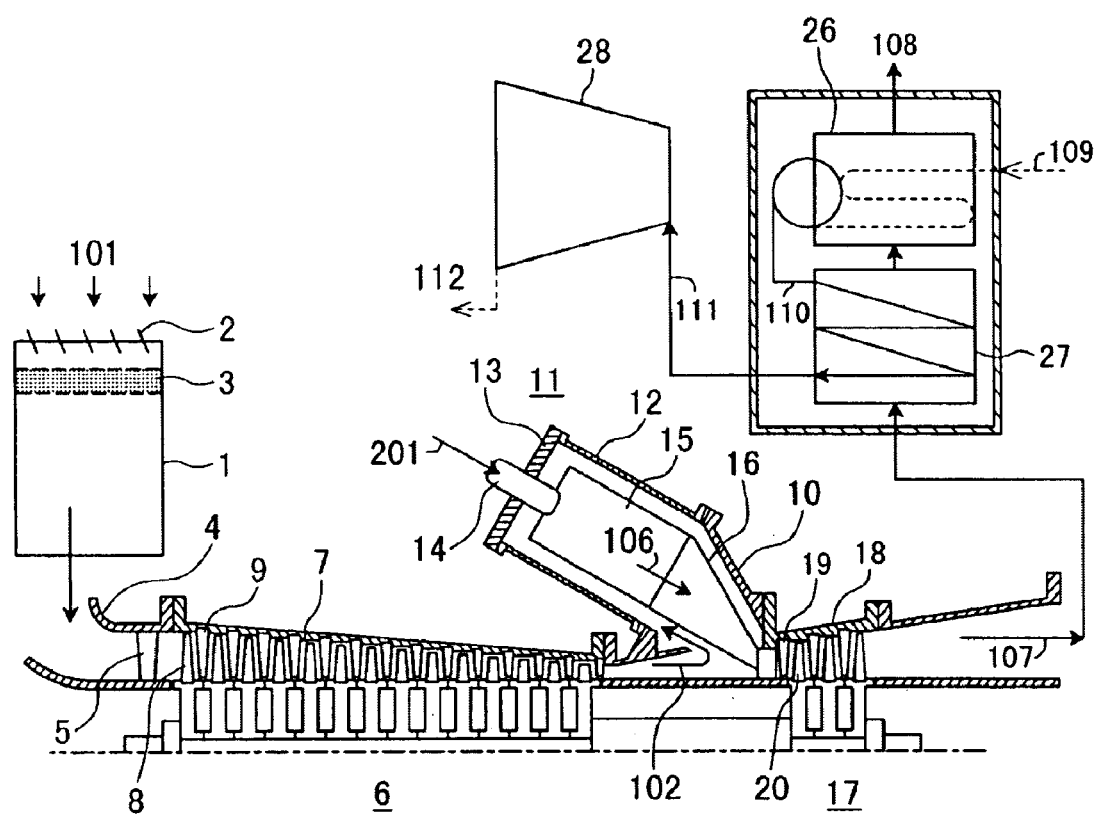
FIG. 3 shows a gas turbine for a combined cycle or a co generation cycle.

FIG. 3 schematically shows the combined cycle or the cogeneration cycle. Supplied water 109 is converted into steam 110 in a boiler 26 through heat exchange with turbine exhaust gas 107, and heated steam 111 is obtained by increasing the temperature of the steam 110 with a heater 27. The combined cycle is realized by rotating a steam turbine 28 with the heated steam 111, and the cogeneration cycle is realized by utilizing the heated steam 111 as one of steam and a heat source.

In the embodiment shown in FIG. 3, a compressor has fourteen stages and a turbine has three stages. With a smaller number of stages than that in the simple cycle, the temperature of the turbine exhaust gas 107 can be increased while the temperature of combustion gas 106 is held constant, whereby the temperature of the heated steam 111 is also increased. Accordingly, in the combined cycle, the output of the steam turbine 28 can be increased and the overall efficiency can be improved. In the cogeneration cycle, the temperature, pressure or flow rate of the heated steam 111 can be increased and the range of supply specifications adapted for thermal needs can be enlarged.

Further, since upstream-stage parts in each of the compressor and the turbine are used in common with the simple cycle and the temperature of the combustion gas is held constant, modifications of the combustor liner, the combustion transition piece, and the turbine stator and moving blades in the upstream stages, which are subjected to high temperatures, are no longer required. Since those parts are subjected to high temperatures in use, they are made of heat-resistant materials and are developed using the advanced cooling techniques. Therefore, if those parts can be used in common in the various cycles, the development cost can be greatly reduced. Also, reliability, such as service life, of the high-temperature parts is confirmed by durability tests under an actual load or a condition simulating the actual load. With the common parts capable of being used in the various cycles, data of reliability tests can be more easily collected and reliability of the high-temperature parts can be improved. The reduction in the number of stages of the compressor may be realized by a method of inserting dummy disks in two downstream stages so that the rotor length is kept the same similarly to the case of FIG. 2. However, the case of FIG. 3 employs, as another example, a method of shortening the rotor length corresponding to the reduction in the number of stages so that the number of parts is cut down and the overall length is compacted.

Figure 4:
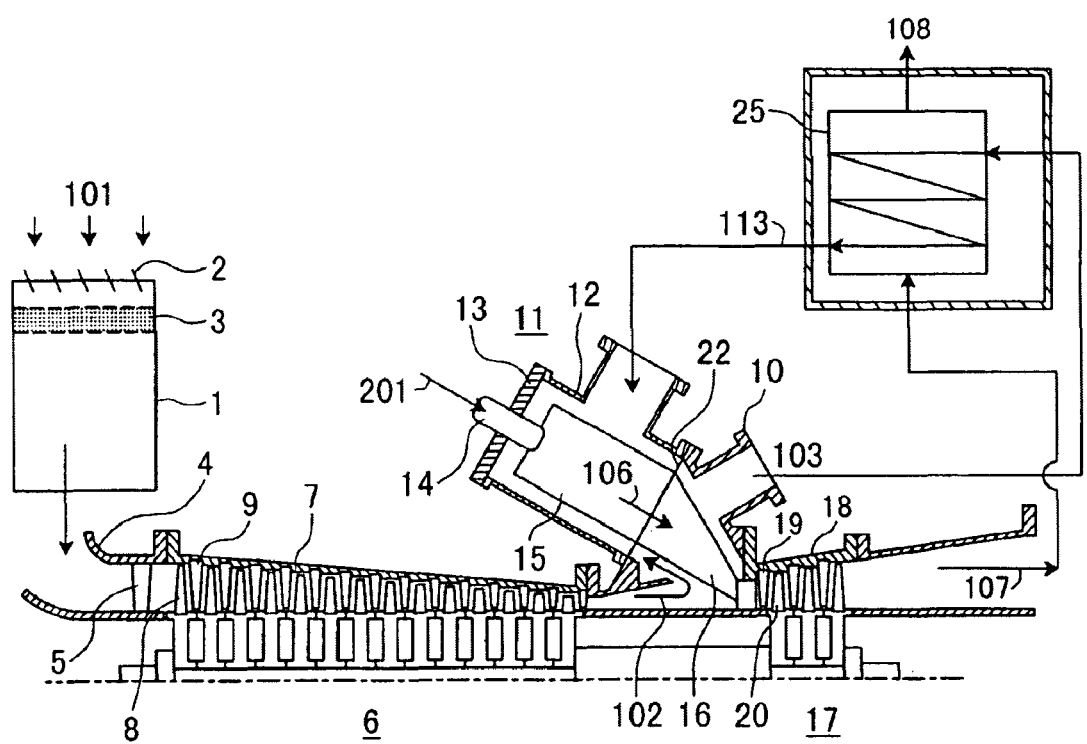
FIG. 4 shows a gas turbine for a regenerative cycle.

FIG. 4 schematically shows the regenerative cycle. The temperature of high-pressure air 103 is increased through heat exchange with turbine exhaust gas 107, and high-temperature air 113 is utilized for combustion. In the embodiment shown in FIG. 4, a compressor has fourteen stages and a turbine has three stages. With a smaller number of stages than that in the simple cycle, the temperature of the turbine exhaust gas 107 can be increased while the temperature of combustion gas 106 is held constant. As a result, the temperature of the high-temperature air 113 is also increased. Accordingly, if the temperature of the combustion gas 106 is the same, the amount of fuel 201 can be reduced and the gas turbine efficiency can be improved. Further, because of the pressure ratio being set to a smaller value, the temperature of the high-pressure air 103 is reduced and the temperature of low-temperature exhaust gas 108 is also reduced. This means that thermal energy is more effectively utilized and the gas turbine efficiency is improved correspondingly.

Moreover, since upstream-stage parts in each of the compressor and the turbine are used in common with the simple cycle and the temperature of the combustion gas is held constant, modifications of the combustion liner, the combustor transition piece, and the turbine stat or and moving blades in the upstream stages, which are subjected to high temperatures, are no longer required. This advantage is the same as that obtained in the combined cycle described above.

Figure 5:
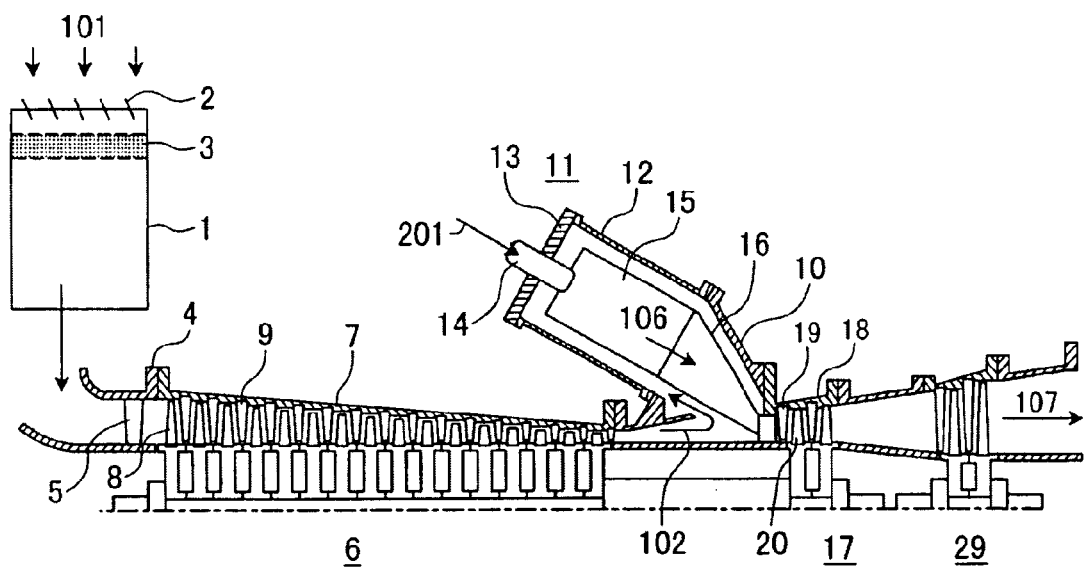
FIG. 5 shows a two-shaft gas turbine.

FIG. 5 schematically shows a two-shaft gas turbine in which a shaft of a turbine for driving a compressor (i.e., a gas generator shaft) and a shaft of a turbine 29 for taking out output power (i.e., a power turbine shaft) are separated from each other. Two upstream stages of the turbine for the other cycles described above are designed so as to provide power required for driving the compressor for the two-shaft operation. Therefore, the two upstream stages of the two-shaft gas turbine employ parts in common with those of the two upstream stages of the turbine in the other cycles. In addition, the number of rotations, etc. Of the output power taking-out turbine can be freely set to be adapted for specifications of a load, e.g., a power generator, a compressor and a pump.

As described above, the gas turbine parts can be used in common in combinations of two or more of the various cycles, such as the simple cycle, the combined cycle, the cogeneration cycle, the regenerative cycle, the high-moisture gas turbine cycle, and the two-shaft gas turbine cycle, according to this embodiment of the present invention.

Further, in the gas turbine described above, it is possible to finely adjust matching in the pressure ratio, the temperature and the flow rate and to further increase the efficiency by slightly modifying the initial or final stage of the compressor after the change in the number of stages or the final stage of the turbine after the change in the number of stages. Also in this case, since most stages in each of the compressor and the turbine can be constructed using parts in common with those used before the change in the number of stages, it is possible to develop in common most of the compressor blade train, which has a difficulty in development thereof, and the upstream turbine vanes, which are made of a heat-resistance material and are developed using the advanced cooling techniques because those vanes are subjected to high temperatures in use. As a result, the cost is cut down, the number of parts for use in maintenance is reduced, and management of the parts is facilitated. Although reliability, such as service life, of the high-temperature parts is confirmed by durability tests under an actual load or a condition simulating the actual load, the use of common parts in the various cycles ensures easier collection of data of reliability tests and improves reliability of the high-temperature parts.

With the above-described first embodiment shown in FIGS. 1 to 9, the parts of the compressor, the combustor, the turbine, etc., particularly the high-temperature parts including the combustor liner, the combustor transition piece, and the turbine stat or and moving blades, can be used in common in the various cycles, such as the simple cycle, the combined cycle, the co generation cycle, the regenerative cycle, the high-moisture gas turbine cycle, and the two-shaft gas turbine cycle. Consequently, the development and production cost and the part management cost can be cut down.

Also, since the various cycles, such as the combined cycle, the co generation cycle, the regenerative cycle, the high-moisture gas turbine cycle, and the two-shaft gas turbine cycle, are constructed using the compressor or the turbine having a smaller number of stages than that in the simple cycle, the pressure ratio can be reduced as compared with that in the simple cycle while the temperature of the combustion gas is held constant. As a result, modifications of the combustion liner, the combustion transition piece, and the turbine stat or and moving blades, which are subjected to high temperatures, are no longer required.

When designing the compressor and the turbine to be adapted for the various cycles, a variable stat or vane is provided in the compressor or the turbine and is adjusted in some case so that an optimum compression ratio and optimum flow rates of the compressor and the turbine are obtained. That case increases the number of parts and pushes up the cost correspondingly. In addition, when a movable portion is provided in the high-temperature part, particularly the turbine, careful checks for reliability are required. In the first embodiment, however, the variable stat or vane is not provided, and the compression ratio and the flow rates of the compressor and the turbine can be adjusted to values optimum for each of the various cycles.

Accordingly, a product lineup adaptable for different output powers, efficiencies, and thermal needs can be prepared while the high-temperature parts, which require a larger amount of labor, a higher cost and a longer period especially in development thereof, are used in common. In this connection, since the high-temperature parts are used in common in various products, reliability, such as service life, can be evaluated in a unified way and a group of products having higher reliability can be constructed.

Further, by inserting the dummy disks and dummy keys when the number of stages of the compressor is reduced, the rotor length can be kept the same as that in each of the various cycles. Therefore, structural modifications of the intake outer casing 4, the compressor outer casing 7, the bearings, and the stacking bolts are no longer required. As a result, the design period can be cut down and the relevant parts can be used in common.

Thus, the first embodiment of the present invention described above with reference to FIGS. 1 to 9 can provide the production process of the gas turbine capable of being applied to various cycles.

A second embodiment of the present invention will be described below with reference to FIGS. 10 to 26.

Power generation cycles using gas turbines are mainly operated as the simple cycle, the combined cycle, and the high-moisture gas turbine cycle. Hitherto, the gas turbines are individually designed depending on the power generation cycle used. Therefore, designed parts are specific to the gas turbine adapted for each of the power generation cycles. Japanese Unexamined Patent Application Publication No. 9-4465 discloses a technique of enabling hardware to be used in common in turbines operated at different frequencies, thereby cutting down the cost.

With the technique disclosed in Japanese Unexamined Patent Application Publication No. 9-4465, however, common hardware is realized by forming an intermediate stage of a turning to have a common shape, and no considerations are paid to a compressor. For that reason, when the pressure ratio and the combustion temperature are changed as necessitated in the case of converting the simple cycle gas turbine to be operated in the combined cycle and the high-moisture gas turbine cycle, it is difficult to utilize the technique disclosed in the above-cited Japanese Unexamined Patent Application Publication in which no considerations are paid to a compressor. In gas turbines operated in the different power generation cycles, therefore, common parts cannot be used and higher production costs have been required. Further, because the gas turbines are designed and produced from the beginning for each of the different power generation cycles, a longer time has been required for production of each gas turbine as compared with the case of using common parts.

The second embodiment of the present invention is intended to suppress the production cost of a gas turbine and to shorten a time required for production of the gas turbine.

To that end, the second embodiment of the present invention is featured in that, among design elements of a gas turbine, those ones used in common in various power generation cycles are designed, and the gas turbine is designed so as to make the common elements adaptable for the various power generation cycles of the produced gas turbine.

The power generation cycles employing a gas turbine include a simple cycle, a combined cycle, and a high-moisture gas turbine cycle.

In the simple cycle, power is generated with the gas turbine alone, and exhaust gas discharged from the gas turbine is not utilized.

In the combined cycle, high-temperature exhaust gas discharged from the gas turbine is supplied to an exhaust heat recovering boiler, and a steam turbine is driven with steam generated from the exhaust heat recovering boiler. Then, power is generated by the gas turbine and the steam turbine.

In the high-moisture gas turbine cycle, compressed air discharged from a compressor is mixed with water or steam supplied from the exterior, and the mixed air is subjected to exhaust gas from the gas turbine, thereby generating high-temperature and high-moisture air. The high-temperature and high-moisture air is supplied to a combustion.

Additionally, a co generation cycle, in which steam produced with the high-temperature exhaust gas discharged from the gas turbine is not used for power generation, but consumed in another system unlike the high-moisture gas turbine cycle, can be regarded as one kind of the simple cycle.

Figure 11:
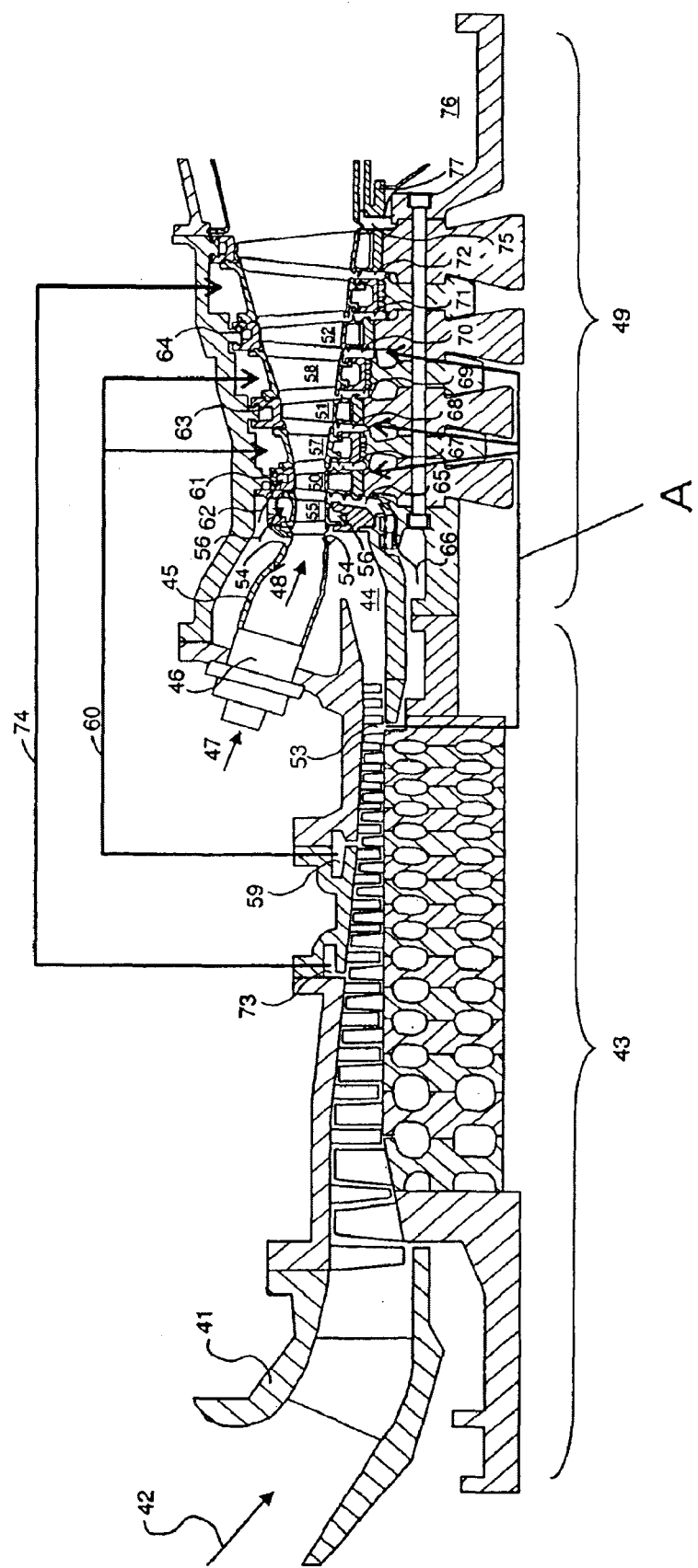
FIG. 11 shows the construction of a gas turbine body.

FIG. 11 shows the construction of a gas turbine according to the second embodiment. The gas turbine mainly comprises a compressor 43 for compressing atmospheric air 42 and generating compressed air, a combustion 46 for mixing and combustion the compressed air and fuel 47 and generating combustion gas 48, and a turbine 49 driven with the combustion gas 48 supplied from the combustor 46.

A description is now made of a manner of operating the gas turbine. First, the atmospheric air 42 is supplied to the compressor 43 through an atmosphere intake portion 41. The compressed air produced with compression by the compressor 43 is supplied to a combustor casing chamber 44 such that the combustor casing chamber 44 is filled with the compressed air. Then, the compressed air in the combustor casing chamber 44 passes a flow sleeve 45 of a double-wall tubular structure and is supplied to the combustor 46. In the combustion 46, the compressed air and the fuel 47 are mixed and combated to produce the combustion gas 48 at a high temperature. The high-temperature combustion gas 48 produced by the combustion 46 is supplied to the turbine 49 and is expanded in the turbine 49 for rotation of buckets. Power generated by the turbine 49 drives not only a power generator, but also the compressor 43.

Because the turbine 49 and the combustor 46 are both subjected to high temperatures with the combustion gas 48, they must be cooled. For this reason, a cooling method will be described below. To cool a first-stage bucket 50, a second-stage bucket 51, and a third-stage bucket 52 of the turbine 49, the compressed air extracted from a final-stage moving blade outlet 53 of the compressor is supplied to the inside of a rotor. Then, the compressed air introduced to the inside of the rotor flows through a central bore of the rotor toward the downstream side of a turbine shaft while the compressed air is supplied to each of the buckets from a wheel side surface (as indicated by routes A in FIG. 11). Note that, in this embodiment, the upstream side of the turbine shaft is assumed to be the combustor side and the direction in which the combustion gas flows in the turbine represents the direction toward the downstream side of the turbine shaft. The combustor 46 is cooled using air 54 for combustion, which flows into the flow sleeve 45 from the combustion casing chamber 44. Air for cooling a first-stage nozzle 55 is provided as air 56 that directly flows into the first-stage nozzle 55 from the combustor casing chamber 44. Air for cooling a second-stage nozzle 57 and a third-stage nozzle 58 is supplied through a pipe 60 from an extraction cavity 59 provided in a casing for an intermediate stage of the compressor, at which a pressure suitable for the cooling ability is obtained. Air for cooling a first-stage shroud 61 positioned around the first-stage bucket 50 is provided as air 62 that directly flows into the first-stage shroud 61 from the combustor casing chamber 44. Air for cooling a second-stage shroud 62 positioned around the second-stage bucket 51 and a third-stage shroud 64 positioned around the third-stage bucket 52 is provided as the air introduced through the pipe 60. Further, in order to prevent the combustion gas 48 from entering a wheel space 65 inside the buckets when the combustion gas 48 passes through a gas path within the turbine 49, compressed air 66 extracted from the final-stage moving blade outlet 53 of the compressor is supplied to the wheel space 65. In addition, the air introduced through the pipe 60 is also supplied to wheel spaces 67, 68, 69 and 70 after passing the interiors of nozzles 57, 58. Air is supplied to wheel spaces 71, 72 through a pipe 74 from an extraction cavity 73 provided in the casing for the intermediate stage of the compressor, at which a pressure suitable for the cooling ability is obtained, after passing the interiors of corresponding nozzles. Air 77 in a rear bearing chamber 76 is supplied to a wheel space 75.

Characteristics of the power generation cycles using a gas turbine, such as the combined cycle, the high-moisture gas turbine cycle, and the simple cycle, will be described below with reference to FIGS. 12 and 13.

Figure 12:
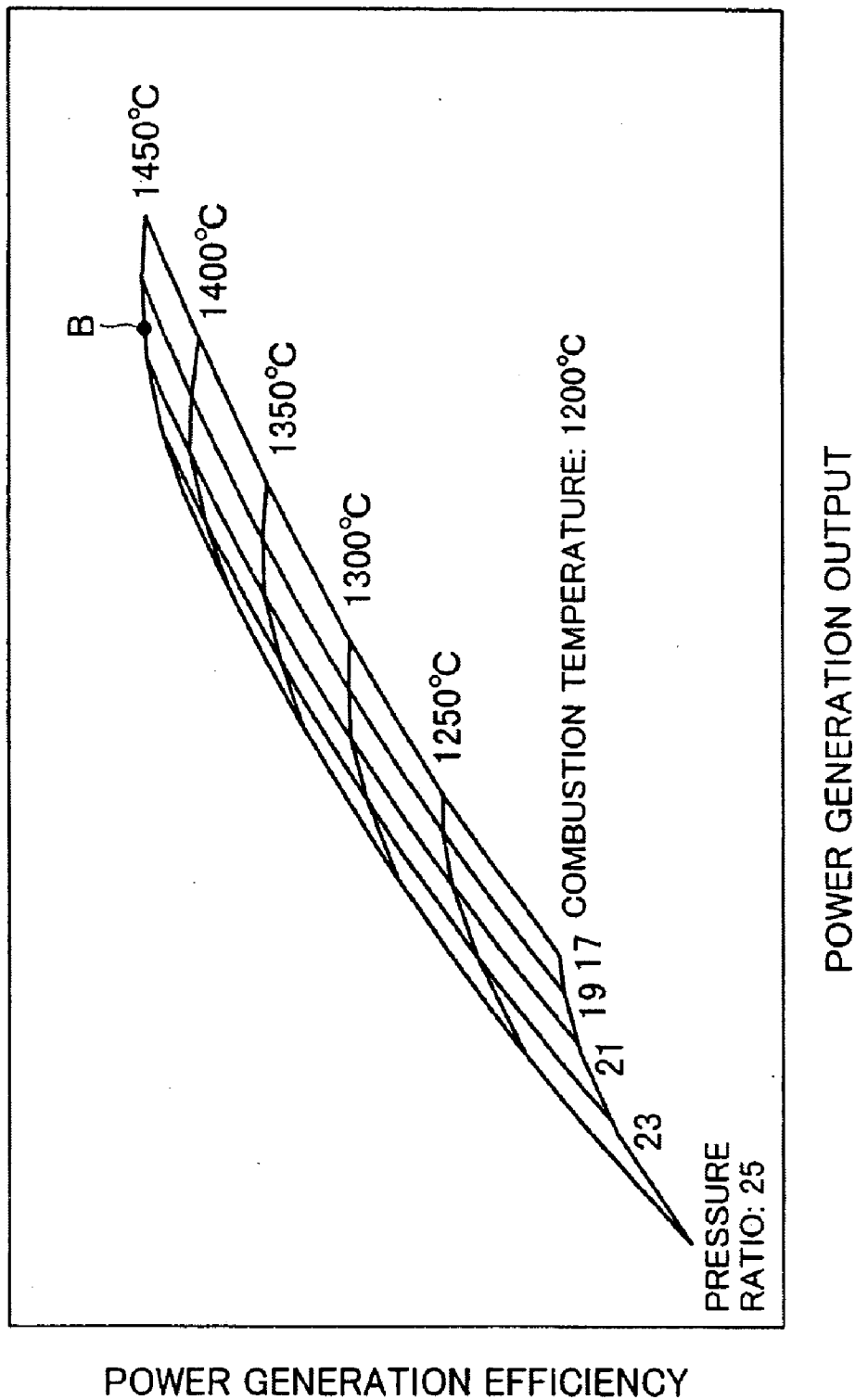
FIG. 12 is a graph showing characteristics of power generation output and power generation efficiency in the combined cycle and the high-moisture gas turbine cycle.

FIG. 12 shows the relationship between power generation output and power generation efficiency in the combined cycle. The high-moisture gas turbine cycle also exhibits almost the same characteristics as those in the combined cycle. Note that, in FIG. 12, the horizontal axis represents the power generation output, and the vertical axis represents the power generation efficiency. Assuming the pressure ratio to be held constant, the relationship between power generation output and power generation efficiency can be determined corresponding to each value of the combustion temperature while changing the combustion temperature. Determined results are thus plotted in FIG. 12. Likewise, results determined when changing the pressure ratio while the combustion temperature is held constant are also plotted in FIG. 12.

As seen from FIG. 12, when the combustion temperature is increased without changing the pressure ratio, both the power generation efficiency and the power generation output increase. The reasons are as follows. In the combined cycle, when the combustion temperature is increased, the temperature of the exhaust gas discharged from the turbine rises and the amount of steam generated from the exhaust heat recovering boiler increases, whereupon the steam temperature and the steam pressure are both increased. Accordingly, the steam turbine output is increased and the power generation efficiency in the combined cycle is also increased. In the high-moisture gas turbine cycle, since the temperature of the exhaust gas discharged from the turbine rises, the amount of water or steam added to the compressed air discharged from the compressor can be increased. Accordingly, the power generation efficiency and the power generation output in the high-moisture gas turbine cycle are both increased.

Further, it is seen from FIG. 12 that, when increasing the pressure ratio at the same combustion temperature, both the power generation efficiency and the power generation output decrease. The reasons reside in that, in the combined cycle and the high-moisture gas turbine cycle, the compressor power is increased and the compressor adiabatic efficiency is reduced with an increase in the pressure ratio, and that the temperature of the compressed air discharged from the compressor rises and the amount of air for cooling a turbine high-temperature portion is increased. Moreover, the characteristics in the combined cycle are also affected in that the temperature of the exhaust gas discharged from the turbine lowers and the steam turbine output is reduced.

In this embodiment, therefore, design conditions optimum for the combined cycle and the high-moisture gas turbine cycle are set to the combustion temperature of 1450° C. And the pressure ratio of 20 (point B in FIG. 12). The reason why the combustion temperature is set to 1450° C. Is as follows. If the combustion temperature is set to a higher value, the power generation efficiency is increased, but the amount of BOX generated during the combustion is also increased. This increases the amount of air for cooling the turbine high-temperature portion. Hence, the combustion temperature is held down to 1450° C.

Figure 13:
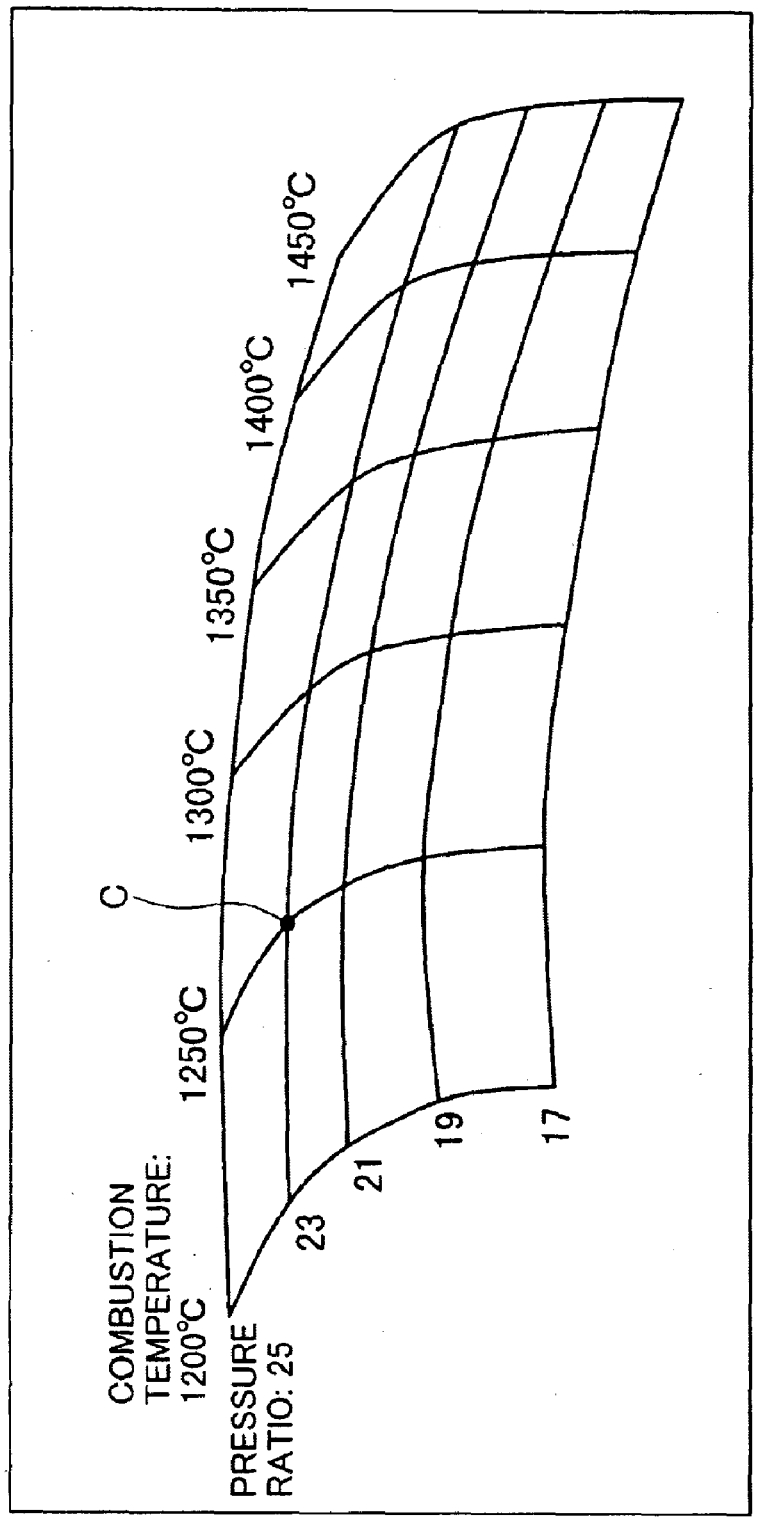
FIG. 13 is a graph showing characteristics of power generation output and power generation efficiency in the simple cycle.

FIG. 13 shows the relationship between power generation output and power generation efficiency in the simple cycle. In FIG. 13, a manner of plotting characteristics in the simple cycle based on the pressure ratio and the combustion temperature is the same as that used in plotting the graph of FIG. 12.

As seen from FIG. 13, when the pressure ratio is increased while the combustion temperature is held at the same value, the power generation efficiency increases. The reason is that, with an increase in the pressure ratio, the compressor power is increased, but the turbine output power is increased beyond the increase in the compressor power.

Also, when the combustion temperature is increased without changing the pressure ratio, the power generation efficiency gradually decreases. The reason is that, with an increase in the combustion temperature, the amount of air for cooling the turbine 49 is increased correspondingly.

In this embodiment, therefore, design conditions optimum for the simple cycle are set to the combustion temperature of 1250° C. And the pressure ratio of 23 (point C in FIG. 13). The reason why the pressure ratio is set to 23 is as follows. If the pressure ratio is set to a higher value, the power generation efficiency is increased. However, if the temperature of the atmospheric air 42 is high, there is a possibility that the temperature of the compressed air discharged from the compressor exceeds 500° C. Accordingly, the pressure ratio is set to 23 from the viewpoint of strength reliability of a compressor rotor material.

As shown in FIGS. 12 and 13, in the combined cycle and the high-moisture gas turbine cycle, the pressure ratio is not required to be set to a high value, but the combustion temperature is required to be set to a high value for the purpose of achieving high power generation efficiency. On the other hand, in the simple cycle, the combustion temperature is not required to be set to a high value, but the pressure ratio is required to be set to a high value.

Corresponding to the characteristics described above, a gas turbine applied to an airplane and having the pressure ratio of not less than 30 (i.e., a high pressure ratio) has hitherto been operated in the simple cycle. However, if the gas turbine applied to an airplane is operated in the combined cycle and the high-moisture gas turbine cycle, there occurs a problem that the temperature of turbine exhaust gas is low because of a high pressure ratio and the power generation efficiency cannot be obtained at a satisfactory level. Also, the combined cycle is primarily employed in a heavy-structure gas turbine dedicated designed for land use, in which the combustion temperature is increased to the range of 1300° C. To 1500° C. (high temperatures) and the pressure ratio is set to 20 or below (i.e., a low pressure ratio). If the heavy-structure gas turbine is operated in the simple cycle, there occurs a problem that the pressure ratio is low and hence high power generation efficiency cannot be obtained. Further, even if the combustion temperature is lowered in the heavy-structure gas turbine, for example, merely by reducing the flow rate of fuel without changing the pressure ratio, a large amount of air for cooling a turbine high-temperature portion still flows under the condition of a high combustion temperature. Hence, an improvement of the power generation efficiency as plotted in FIG. 13 cannot be achieved.

In consideration of the characteristics shown in FIGS. 12 and 13, it is ideal to develop gas turbines operated at the combustion temperature and the pressure ratio, which can provide high power generation efficiency in each of the simple cycle, the combined cycle, and the high-moisture gas turbine cycle. However, preparing a plurality of gas turbines raises problems of pushing up the development cost and of increasing the maintenance cost of the production line. Another problem is that gas turbines are employed in more increasing versatile modes and a serious development risk would be resulted if the development is specialized in any type of gas turbine which is expected to increase a market share in future.

Figure 10:
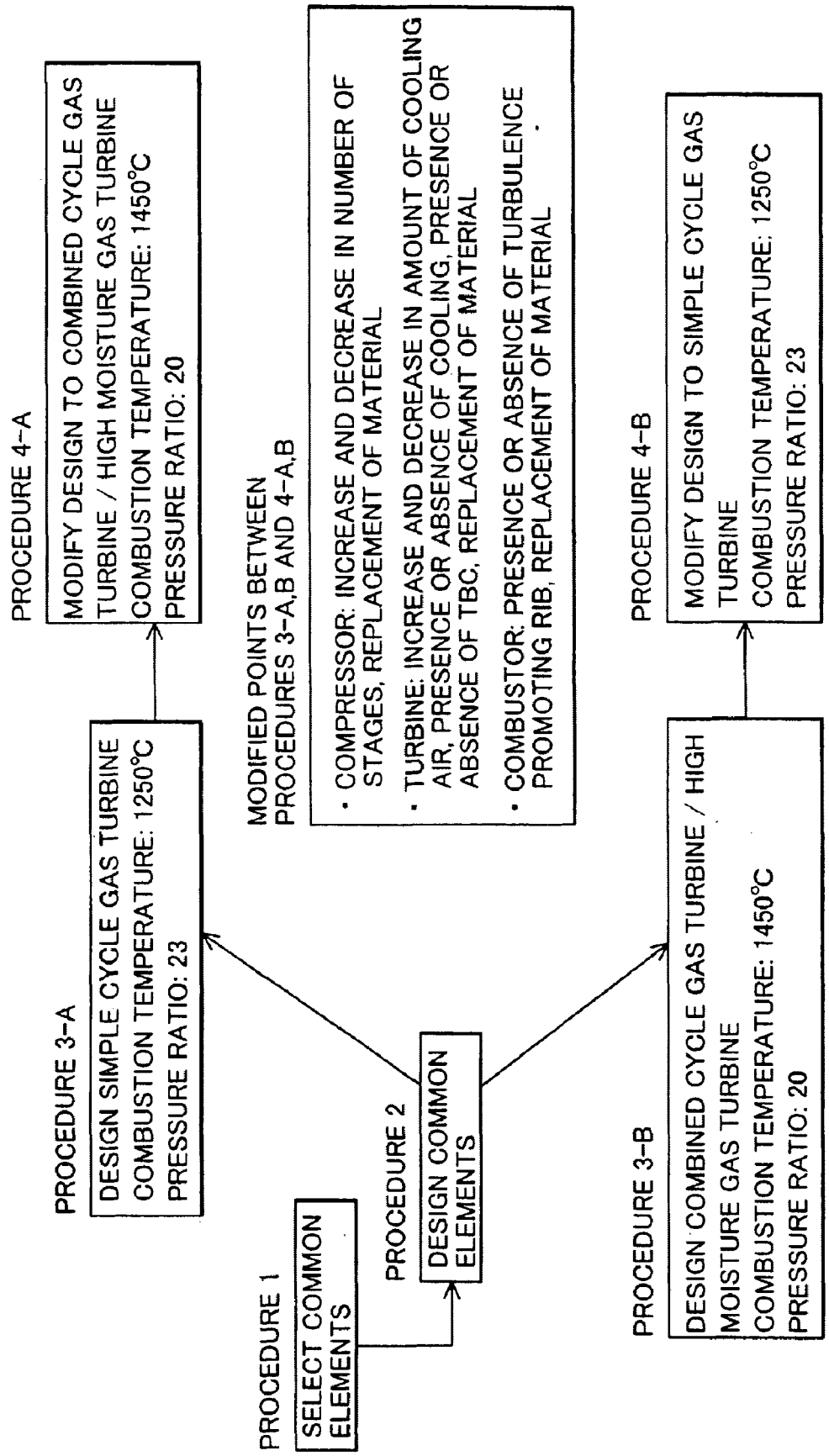
FIG. 10 is a flowchart showing a design process and a modification process for operation in the simple cycle, the combined cycle, and the high-moisture gas turbine cycle.

FIG. 10 shows a design process for obtaining high power generation efficiency in each of the simple cycle, the combined cycle, and the high-moisture gas turbine cycle according to this second embodiment.

In Procedure 1 of FIG. 10, common elements are selected from among a plurality of design elements, such as a compressor airfoil, a combustion rotor and a turbine airfoil, which are required in designing a compressor, a combustion and a turbine, and which constitute a gas turbine. The design elements have parameters and can be designed by giving respective parameter values. Also, the term "common elements" means design elements used in common in the simple cycle, the combined cycle, and the high-moisture gas turbine cycle. In this embodiment, it is assumed that the common elements designed to be used in common in the various power generation cycles are the airfoil and the rotor of the compressor 43, the airfoil and the rotor of the turbine 49, and the casing shown in FIG. 11. Then, the parameters for each of the common elements are given as the combustion temperature and the pressure ratio, and each common element can be designed by utilizing values of those parameters.

Next, in Procedure 2, the common elements selected in Procedure 1 are designed. When designing the common elements, the parameter values must be set. Accordingly, based on optimum design conditions of the combustion temperature and the pressure ratio in the various power generation cycles, a value of at least one of the combustion temperature and the pressure ratio (parameter value) suitable for each of the common elements is set.

By designing each common element under a maximum pressure ratio, a gas path shape including the airfoil of the compressor 43 can be easily applied to the various power generation cycles. In this embodiment, therefore, the gas path shape is designed under the design condition of the simple cycle in which the pressure ratio is high. As a result, when operating the gas turbine in the combined cycle or the high-moisture gas turbine cycle, the gas turbine is adaptable as it is or with a slight improvement because it is just required to set the pressure ratio to a lower value.

Regarding the rotor of the compressor 43, since the temperature of the compressed air discharged from the compressor 43 increases, the temperature of the compressor rotor also increases. Therefore, the compressor rotor is designed under the condition of the simple cycle (high pressure ratio) in which thermal stress acting on the compressor rotor is enlarged. When the gas turbine is operated in the combined cycle and the high-moisture gas turbine cycle, the rotor structure can be employed as it is because the pressure ratio is low.

The airfoil of the turbine 49 is preferably designed under the condition of a high pressure ratio. The reason is that, if an airfoil loss is increased, the temperature of the exhaust gas discharged from the turbine 49 rises and the power generation efficiency lowers. In this embodiment, a gas path shape including the airfoil of the turbine 49 is designed under the condition of the simple cycle in which the pressure ratio is high. With the gas path shape thus designed to be adapted for the simple cycle, when the gas turbine is applied to the combined cycle or the high-moisture gas turbine cycle, the airfoil loss increases. However, the temperature of the exhaust gas discharged from the turbine 49 rises correspondingly. As a result, the output power of the steam turbine and the amount of steam contained in the compressed air are both increased, and a reduction in the power generation efficiency is suppressed in an overall power generation cycle.

The turbine rotor is designed under the condition of the combined cycle and the high-moisture gas turbine cycle in which the temperature of the combustion gas 48 is high and the temperature of air for cooling the turbine moving blades is low. In this embodiment, the turbine rotor is designed under the condition in which a temperature difference in the radial direction of the turbine rotor is large and thermal stress is also large. Accordingly, when the gas turbine is modified to be adaptable for the simple cycle in which the temperature of the combustion gas 48 is low, the rotor structure can be employed as it is.

The casing is designed under the condition of a high pressure ratio. Because the compressor side and the turbine side are both subjected to the compressed air, the casing is designed under the condition of the simple cycle in which the pressure ratio is high. By so designing the casing, when the gas turbine is modified to be adapted for the combined cycle or the high-moisture gas turbine cycle (low pressure ratio), the casing structure on the compressor side can be applied as it is. On the turbine side, however, because the combustion temperature is increased, the casing structure must be modified to cope with the increased combustion temperature.

FIG. 14 shows the results obtained when a value of at least one of the combustion temperature and the pressure ratio (parameter value) suitable for each of the common elements is set, as described above, based on the optimum design conditions of the combustion temperature and the pressure ratio in the various power generation cycles. Using the set parameter value, it is possible to design the common elements of the gas turbine in advance.

A description is now made of Procedure 3-A in which the gas turbine is designed such that the common elements designed in Procedure 2 are adapted for the simple cycle. Referring to FIG. 14, only the turbine rotor among the common elements has the setting value of the combustion temperature adapted for the combined cycle and the high-moisture gas turbine cycle. With the turbine rotor designed under the condition of the combustion temperature being 1450° C., when the gas turbine is modified to be adapted for the simple cycle, a difference occurs just in that the combustion temperature of the turbine rotor lowers in the power generation cycle of the gas turbine. Accordingly, there is no necessity of newly designing the turbine rotor again. FIG. 15 compares the parameter setting values of the common elements designed in advance with the parameter values of the common elements in the simple cycle. In FIG. 15, a denominator represents a value of the combustion temperature or the pressure ratio (parameter value) of each common element designed in Procedure 2. Also, a numerator represents a value of the combustion temperature or the pressure ratio (parameter value) of each common element in the simple cycle.

A description is now made of Procedure 3-B in which the gas turbine is designed such that the common elements designed in Procedure 2 are adapted for the combined cycle and the high-moisture gas turbine cycle. Referring to FIG. 14, the compressor airfoil and rotor, the turbine airfoil, and the casing are designed at the combustion temperature and the pressure ratio optimum for the simple cycle. Among those common elements, the compressor airfoil and rotor are each set to the pressure ratio of 23, and therefore can be employed, as they are, in the combined cycle and the high-moisture gas turbine cycle (in which the pressure ratio is 20). However, because the combustion temperature designed in the combined cycle and the high-moisture gas turbine cycle is 1450° C., the combustion temperature of 1250° C. Designed in Procedure 2 for the turbine airfoil and the casing exceeds an allowable value of the combustion temperature. Accordingly, when the turbine airfoil and the casing are modified to be adapted for the combined cycle and the high-moisture gas turbine cycle, supplementary design items must be changed. Taking the turbine airfoil as an example, the supplementary design items mean points modified in design, such as change in the amount of cooling air supplied to the buckets of the turbine 49 resulting from changing the temperature of the cooling air depending on changes in the combustion temperature and the pressure ratio, the presence or absence of cooling on the turbine downstream-stage side, the presence or absence of TBC (Thermal Barrier Coating) applied to airfoil surfaces, and replacement of material. In other words, the supplementary design items mean points for which the gas turbine is designed and modified so as to make the common elements adaptable for the different power generation cycles. FIG. 16 compares, similarly to FIG. 15, the parameter setting values of the common elements designed in advance with the parameter values of the common elements in the combined cycle and the high-moisture gas turbine cycle.

Thus, in the gas turbines designed in Procedures 3-A and 3-B, since the common elements are selected from among the design elements and then designed, the gas turbines have the common elements for which the values of the combustion temperature and the pressure ratio in the desired power generation cycle of each gas turbine differ from the value of at least one of the combustion temperature and the pressure ratio utilized in design of the common elements. However, when the gas turbine is deigned, for example, such that the common elements designed for the simple cycle in Procedure 2 is adaptable in the next step for the combined cycle and the high-moisture gas turbine cycle, modifications of the common elements can be held within the extent of modifications in the supplementary design items.

Accordingly, by designing the common elements of the gas turbine in Procedure 2 beforehand, the following advantage is obtained. In any of the case of designing the simple cycle (Procedure 3-A) and the case of designing the combined cycle and the high-moisture gas turbine cycle (Procedure 3-B), modifications of the common elements can be held within the extent of design of the supplementary design items while an endeavor can be focused on design of the design elements other than the common elements. As a result, the design cost of the gas turbine can be suppressed in comparison with the case of designing the gas turbine from the beginning. It is also possible to cut down a time required for design of the gas turbine. Another advantage is that, since the design of the gas turbine is not specialized to one particular gas turbine cycle, the gas turbine is flexibly adaptable for changes in market needs and a development risk can be distributed.

Easiness in design change from the gas turbine designed in Procedure 3-A or 3-B through the step of designing the common elements from among the deign elements into another one adapted for the power generation cycle different from that designed in Procedure 3-A or 3-B will be described below.

A description is made of modifications in the supplementary design items, which are necessitated when the gas turbine is modified in design such that the common elements designed in accordance with Procedure 2 and included in the simple cycle gas turbine are adapted for the combined cycle and the high-moisture gas turbine cycle.

Because the pressure ratio during actual operation of the gas turbine is reduced, points to be modified in the compressor possibly include, e.g., a decrease in the number of stages of the compressor and replacement of materials of the compressor airfoil and rotor and the casing, which is necessitated with lowering of the temperature of the compressed air caused by a reduction in the pressure ratio. However, the compressor airfoil and rotor and the casing are designed at the pressure ratio of 23 in Procedure 2, and hence the design change of the compressor is relatively easy.

Points to be modified in the turbine possibly include, e.g., an increase or decrease in the amount of cooling air, the presence or absence of cooling on the turbine downstream-stage side, the presence or absence of TIC (Thermal Barrier Coating) applied to airfoil surfaces, and replacement of material, which are necessitated from the fact that the combustion temperature during actual operation of the gas turbine is changed and the temperature of air for cooling the high-temperature portion of the turbine is changed depending on the change in the pressure ratio. In particular, because the turbine airfoil is produced with precision casting, it is required to select which one of a single crystal, unidirectional solidification and a polycrystal is used to produce the airfoil. With the turbine airfoil designed at the combustion temperature of 1250° C. In Procedure 2, when the gas turbine is actually operated in the combined cycle and the high-moisture gas turbine cycle, the combustion temperature exceeds an allowable value. Accordingly, it is conceivable to employ a single-crystal airfoil having superior strength against high temperatures.

Points to be modified in the combustor possibly include, e.g., the presence or absence of turbulence promoting ribs and replacement of material because the temperature of the compressed air (cooling air supplied to the gas turbine) varies depending on changes in the combustion temperature and the pressure ratio.

A description is made of modifications in the supplementary design items, which are necessitated when the gas turbine is modified in design such the common elements designed in accordance with Procedure 2 and included in the combined cycle and the high-moisture gas turbine cycle are adapted for the simple cycle.

Because the pressure ratio during actual operation of the gas turbine is increased, points to be modified in the compressor possibly include, e.g., an increase in the number of stages of the compressor and replacement of materials of the compressor airfoil and rotor and the casing, which is necessitated with lowering of the temperature of the compressed air caused by an increase in the pressure ratio. However, the compressor airfoil and rotor and the casing are designed at the pressure ratio of 23 in Procedure 2, and hence the design change of the compressor is relatively easy.

Regarding points to be modified in the turbine, because the gas turbine has been operated at a temperature (1450° C.) Higher than the combustion temperature (1250° C.) Set when the turbine airfoil and the casing were designed in Procedure 2, modifications in the supplementary design items have been performed so as to ensure durability against the operated at the higher temperature. However, because the combustion temperature during the operation of the gas turbine is reduced with change to the simple cycle, there is no necessity of making the modifications in the supplementary design items to be endurable against the combustion temperature of 1450° C. Accordingly, it is also conceivable to employ a polycrystal line airfoil that has low strength at a high temperatures, but can be produced at a low cost. Also, the turbine airfoil is designed in Procedure 2 at the pressure ratio suitable for the simple cycle, and therefore it can be easily modified. The turbine rotor requires no modifications because the combustion temperature during the operation of the gas turbine is reduced. In addition to the modifications described above, points to be modified in the turbine possibly include, e.g., an increase or decrease in the amount of cooling air necessitated with a variation in the temperature of the cooling air depending on change in the pressure ratio, the presence or absence of cooling on the turbine downstream-stage side, the presence or absence of TBC (Thermal Barrier Coating) applied to airfoil surfaces, and replacement of material. Further, since the combustion temperature lowers and the pressure ratio increases, the temperature of the combustion gas discharged from the combustion also lowers. In some case, therefore, cooling of the third-stage bucket 52 of the turbine 49 may be dispensed with.

Points to be modified in the combustion possibly include, e.g., the presence or absence of turbulence promoting ribs and replacement of material because the temperature of the compressed air (cooling air supplied to the gas turbine) varies depending on changes in the combustion temperature and the pressure ratio.

Thus, when the gas turbine is modified in design such that the common elements included in the gas turbine, which has been designed through the step of selecting and designing the common elements from among the deign elements, are adapted for the desired power generation cycle, the modifications can be held within the extent of modifications in the supplementary design items regarding the common elements. In the case of the compressor, for example, the gas turbine can be modified in design so as to make the common elements adaptable for the different power generation cycles by performing modifications in the supplementary design items regarding the compressor airfoil, such as an increase or decrease in the number of stages of the compressor and replacement of materials of the compressor airfoil and rotor and the casing.

Consequently, by designing the gas turbine for each of the various power generation cycles based on the common elements designed in advance, when deign change to the different power generation cycle is desired in the next step, the gas turbine can be modified in design in a shorter time only with slight modifications. Also, the cost can be cut down as compared with the case of designing the gas turbine again from the beginning and a development risk can be effectively distributed.

This embodiment can be practiced in the following two business models.

First, a gas turbine production maker produces a gas turbine designed in Procedure 3-A or 3-B and ships the gas turbine as a final product. In this model, in response to a customer's order, the gas turbine production maker designs and produces a gas turbine for a desired one of the various power generation cycles based on the common elements (Procedure 3-A or 3-B), and then delivers the produced gas turbine. Stated otherwise, the gas turbine is designed such that the common elements designed in Procedure 2 are adapted for the desired power generation cycle in which the produced gas turbine is to be operated. In comparison with the case of designing all the design elements from the beginning, therefore, modifications of the common elements can be held within the extent of slight changes, i.e., modifications in the supplementary design items, and the cost of design and production of the gas turbine can be suppressed. Further, since the gas turbine is not specialized to a particular one of the various power generation cycles, the gas turbine production maker is promptly adaptable for a customer's order and a development risk can be effectively distributed.

Second, a gas turbine production maker produces a gas turbine designed in Procedure 4-A or 4-B and ships the gas turbine as a final product. Because the gas turbine production maker has already finished design of the gas turbine in Procedure 3-A or 3-B, points to be designed in response to a customer's order are only modifications in the supplementary design items. In comparison with the first model, therefore, the gas turbine production maker is more promptly adaptable for the customer's order. Further, the cost of design and production of the gas turbine can be suppressed.

The gas turbine designed in Procedure 3-A or 3-B and shipped as a final product is designed such that the common elements are adapted for the power generation cycle of the produced gas turbine. Then, even when the gas turbine is modified to be adapted for the power generation cycle different from that employed in production of the gas turbine, the gas turbine is modified in design such that the common elements are adapted for the power generation cycle of the modified gas turbine, while modifications are held within the extent of modifications in the supplementary design items regarding the common elements. Accordingly, values of the combustion temperature and the pressure ratio in the desired power generation cycle of the modified gas turbine differ from a value of at least one of the combustion temperature and the pressure ratio utilized in design of the common elements. When the gas turbine is modified in such a way, actual operation records of the gas turbine designed in Procedure 3-A or 3-B are accumulated by the customer, and hence the modifications are performed on the basis of the actual operation records. This results in an advantage that reliability is improved. Further, since points to be modified are just modifications in the supplementary design items regarding the common elements, it is possible to suppress the cost required for modifying the gas turbine and to cut down a time required for the modifications.

Next, a description is made of modifications in the supplementary design items, which are necessitated when the gas turbine is designed such that the designed common elements are adapted for the desired power generation cycle, or when the gas turbine having been once designed is modified in design to be adapted for a different one of the various power generation cycles. Note that modifications in the supplementary design items, described below, are also performed when the gas turbine, which has been designed so as to make the common elements adaptable for the power generation cycle of the produced gas turbine and has been shipped as a final product, is modified to be adapted for a different one of the various power generation cycles.

Figure 17:
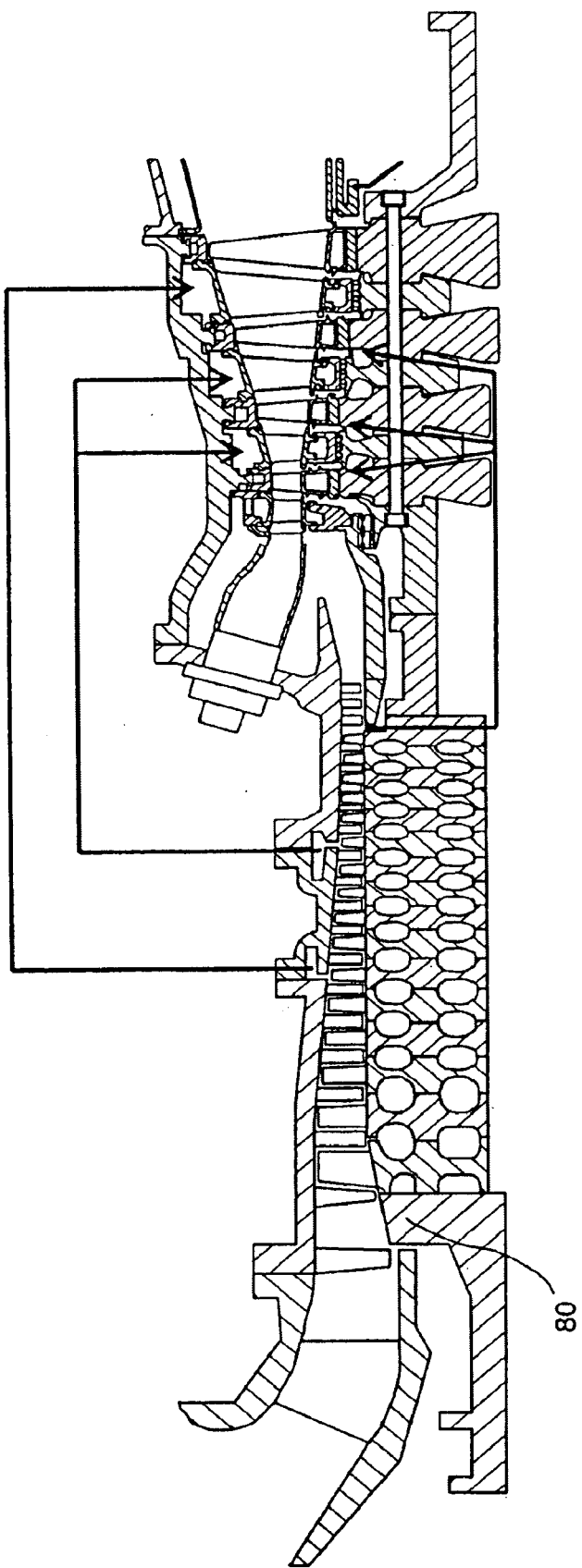
FIG. 17 shows the case in which outer peripheral blades of a rotor on the front side of a compressor are omitted.

FIG. 17 shows a point to be modified in the compressor when design change is made from the simple cycle to the high-moisture gas turbine cycle according to this embodiment. The point to be modified is an omission of a blade mounted over an outer periphery of a front rotor 80 of the compressor. In the high-moisture gas turbine cycle, the mass flow rate of the combustion gas passing through the turbine tends to increase in amount corresponding to addition of steam to the compressed air discharged from the compressor. Contrary to a desire for a reduction in the pressure ratio, the pressure ratio in the compressor is increased with an increase in the mass flow rate of the combustion gas at the turbine inlet. It is therefore effective to reduce the amount of the atmospheric air 42 sucked by the compressor. For that reason, in this embodiment, the blade mounted over the outer periphery of the compressor front rotor 80 is omitted to reduce the amount of the atmospheric air 42 sucked by the compressor. Thus, such a modification is intended to reduce the pressure ratio and to improve the power generation efficiency.

Figure 18:
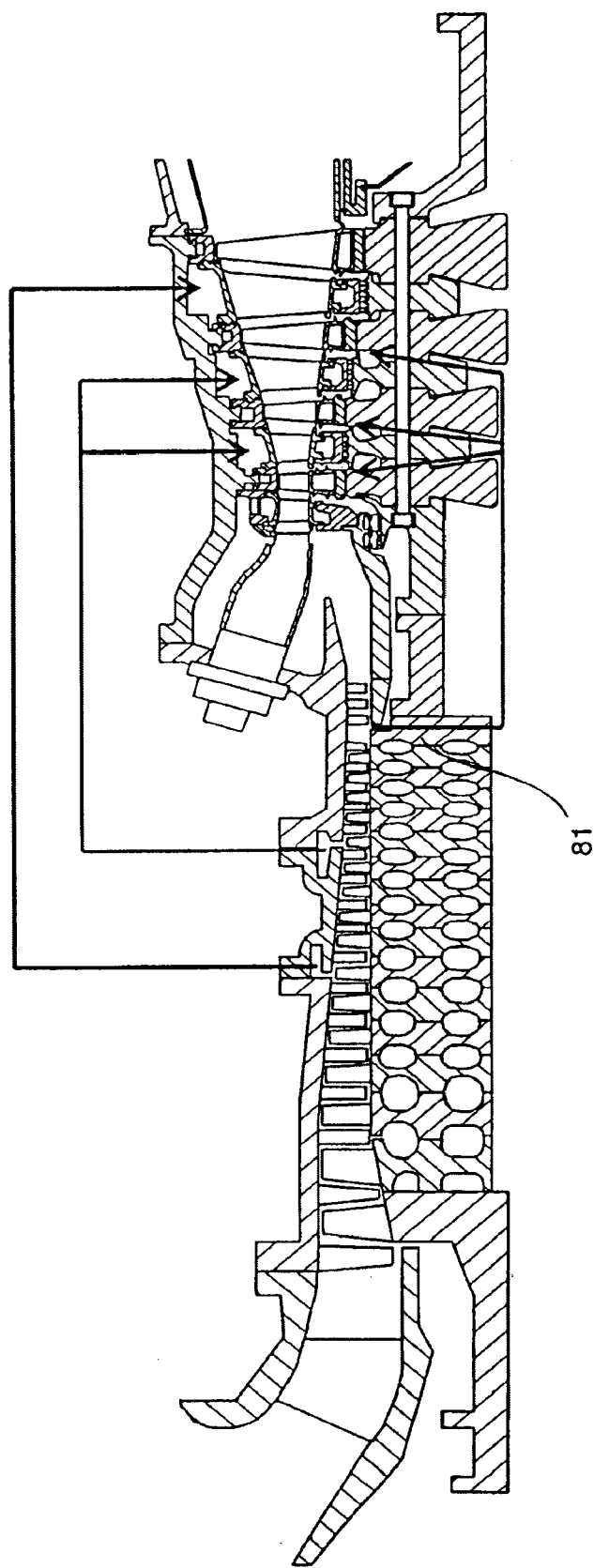
FIG. 18 shows the case in which outer peripheral blades of a rotor on the rear side of a compressor are omitted.

FIG. 18 shows a point to be modified in the compressor when design change is made from the simple cycle to the combined cycle. The point to be modified is an omission of a blade mounted over an outer periphery of a rear rotor 81 of the compressor. In the gas turbine operated in the combined cycle, the amount of the atmospheric air 42 sucked by the compressor is not required to change, but the pressure ratio is desirably reduced. To that end, it is effective to omit the blade of the compressor in the downstream stage.

The compressor airfoil is designed at the pressure ratio of 23 in Procedure 2. Therefore, the design change is adaptable merely by adjusting the number of compressor blades as shown in FIGS. 17 and 18, and the other portions require no modifications. This results in advantages that the design change can be simply and promptly adapted and the cost can be cut down. Further, a reduction in risk of development can be achieved.

Conversely, when modifying the gas turbine from the combined cycle and the high-moisture gas turbine cycle to the simple cycle, the modification can be adapted by increasing the number of compressor blades in design change. The reason is that, because the compressor airfoil is designed at the pressure ratio of 23 in Procedure 2, it is adaptable for an increase in the pressure ratio when the gas turbine is actually operated.

A point to be modified in the turbine bucket according to this embodiment will be described below.

Figure 19:
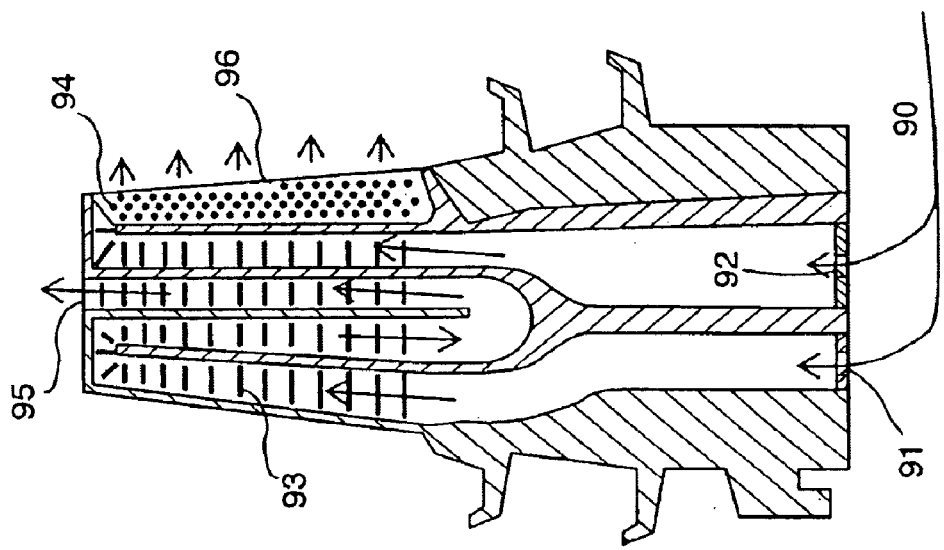
FIG. 19 shows a section of a turbine bucket in the simple cycle.

FIG. 19 shows a section of the turbine bucket (in the simple cycle) when the common elements are designed in Procedure 2. Cooling air 90 introduced through the rotor is supplied to the interior of the bucket through orifices 91, 92 for adjusting the flow rate of the cooling air. Turbulence promoting ribs 93 and pin fins 94 are disposed in cooling passages within the bucket for the purpose of increasing a heat transmission rate and enhancing the effect of cooling. The cooling air passing the orifice 91 is ejected from an outer periphery 95 of the bucket after making a U-turn twice. The cooling air passing the orifice 92 is ejected from a rear edge 96 of the bucket after making a U-turn once and passing the pin fins 94.

Figure 20:
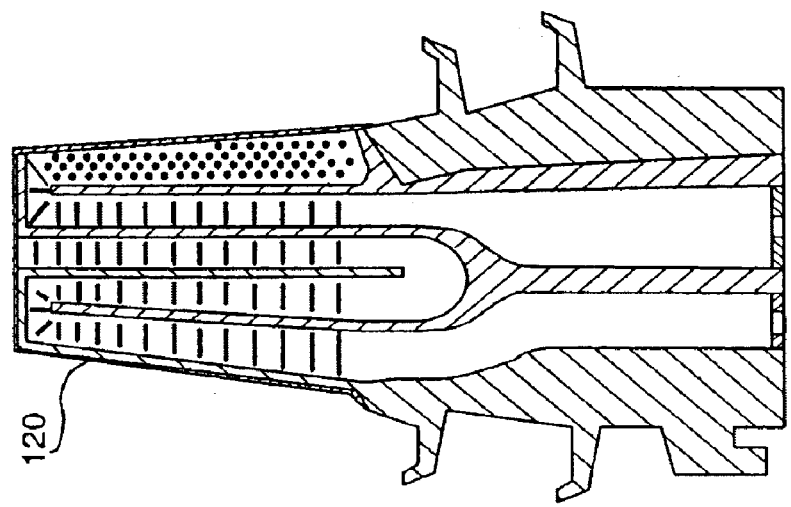
FIG. 20 shows the case in which a thermal barrier coating is applied to the turbine bucket.
Figure 22:
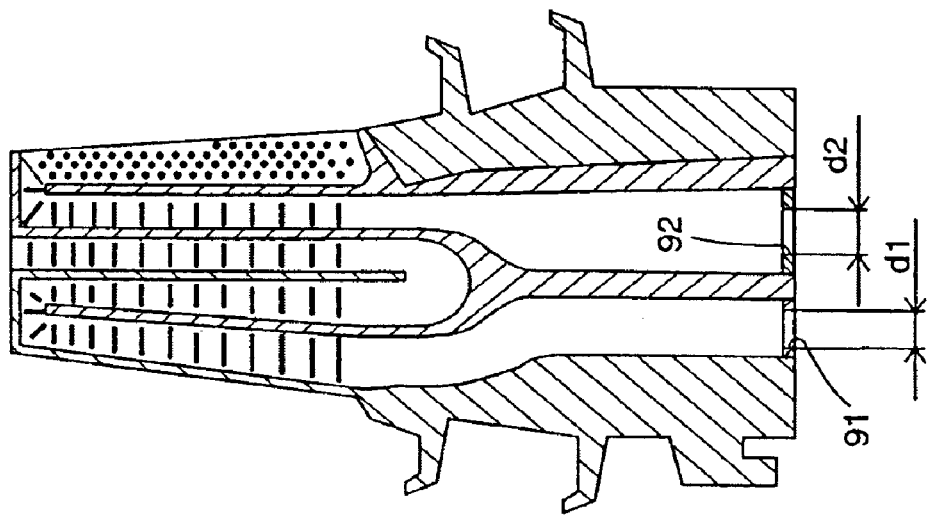
FIG. 22 shows the case in which diameters of cooling orifices formed in the turbine buckets are changed.
Figure 21:
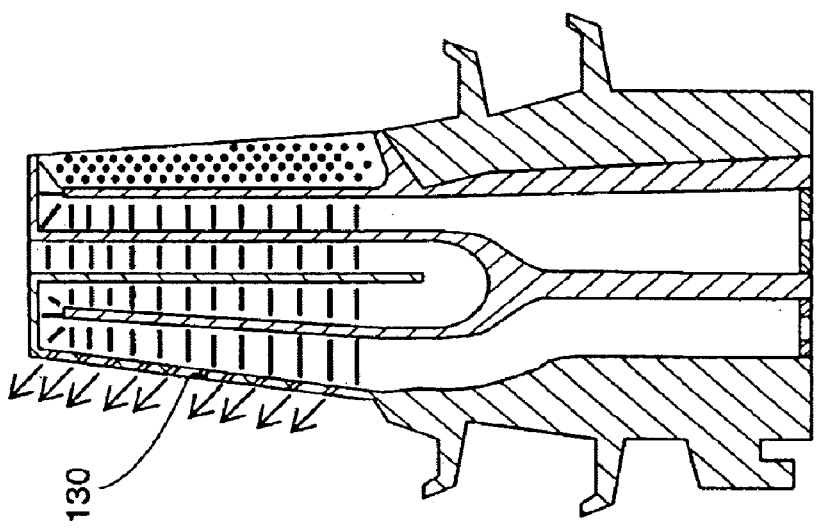
FIG. 21 shows the case in which film cooling holes are provided in the turbine bucket.

As described above, the turbine bucket is designed at the combustion temperature of 1250° C. when the common elements are designed in Procedure 2. Because the combustion temperature during the operation of the gas turbine is set to 1450° C. in design change to Procedure 4-A, a modification endurable against the combustion temperature of 1450° C. is required. FIGS. 20, 21 and 22 show examples of the design change when the turbine bucket in the simple cycle, shown in FIG. 19, is modified to be adapted for the combined cycle and the high-moisture gas turbine cycle. A point modified in FIG. 20 is that a TBC (Thermal Barrier Coating) 120 is applied to a bucket surface. Although the combustion temperature rises, an increase in the temperature of metals disposed inside the TBC 120 can be suppressed with the presence of the TIC 120. In FIG. 21, film cooling holes 130 are formed in a front edge portion of the bucket. The outer side of the front edge portion of the bucket has a high heat transmission rate and metals present on the outer side tend to be subjected to high temperatures. The provision of the film cooling holes 130 is effective in creating a layer of cooling air on the bucket surface and avoiding direct contact of the combustion gas with the bucket surface. With the modifications shown in FIGS. 20 and 21, it is possible to reduce a temperature gradient in the metals, which is caused with the temperature difference between the combustion gas and the cooling air. Accordingly, thermal stresses caused in the bucket can be held down and reliability can be improved. Also, applying the TIC 120 to the turbine nozzle or forming the film cooling holes in it can provide a similar effect to that obtained in the bucket. In FIG. 22, flow passage diameters d1, d2 of the orifices 91, 92 are enlarged to increase the flow rate of the cooling air. With the increased flow rate of the cooling air, the heat transmission rate on the cooling flow passage side can be increased and hence a rise of the bucket metal temperature can be suppressed. Further, the orifices 91, 92 can be provided using members separate from the bucket, and therefore the orifice diameters d1, d2 can be easily defined with machining of the members alone in which the orifices are formed. Even if the machining to define the orifice diameters d1, d2 is failed, only the orifices 91, 92 are just required to form again, and the overall bucket is prevented from being wasted. In addition, by combining the modifications shown in FIGS. 20, 21 and 22 with each other, a synergistic effect of Nanking the cooling ability is achieved. When the high-moisture gas turbine cycle or the combined cycle is modified to the simple cycle, such a modification can be adaptively realized at high efficiency, high reliability and a low cost by omitting the application of the TBC 120, obviating the formation of the film cooling holes, or reducing the orifice diameters.

Figure 23:
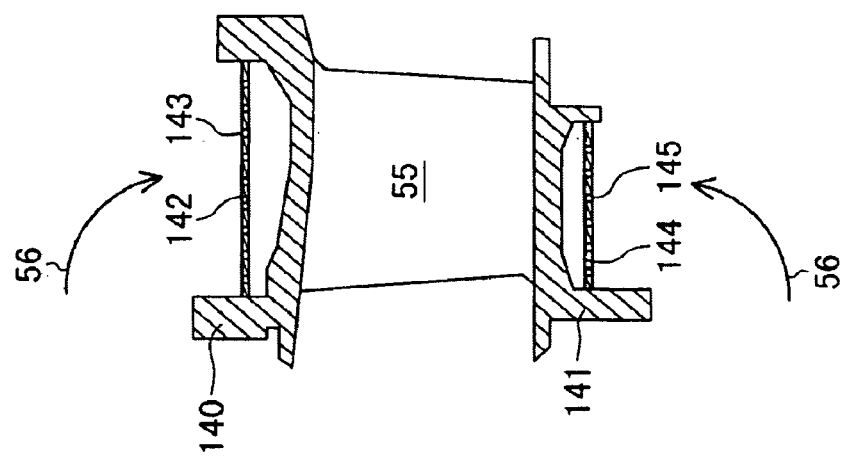
FIG. 23 shows a first-stage turbine nozzle.

FIG. 23 shows a first-stage nozzle 55 shown in FIG. 11. A part of the compressed air discharged from the compressor and filled in the combustion casing chamber is supplied, as cooling air 56, to the first-stage nozzle 55 from both the inner and outer sides thereof. A plate 142 is attached to an outer frame 140, and the cooling air 56 is supplied to the first-stage nozzle 55 through a plurality of holes 143 formed in the plate 142. Likewise, a plate 144 is attached to an inner frame 141, and the cooling air 56 is also supplied to the first-stage nozzle 55 through a plurality of holes 145 formed in the plate 144.

When the gas turbine is modified from the simple cycle to the combined cycle and the high-moisture gas turbine cycle, the combustion temperature during the operation of the gas turbine is increased. This leads to necessity of increasing the flow rate of the cooling air 56, but the necessity is adaptable by increasing the number of the holes 143, 145 or enlarging their diameters. Further, the plates 142, 144 provided as members respectively separate from the frames 140, 141, and therefore the holes 143, 145 can be easily formed with machining of the plates 142, 144 alone. Even if the machining to form the holes 143, 145 is failed, only the plates 142, 144 are just required to prepare again, and the overall nozzle is prevented from being wasted. Conversely, when the gas turbine is modified from the combined cycle and the high-moisture gas turbine cycle to the simple cycle, the modification is adaptable by lessening the number of the holes 143, 145 or reducing their diameters contrary to the above-described case. In addition, because the other nozzles can also be constructed to have a structure of cooling those nozzles with holed plates attached to respective frames, the amount of cooling air supplied to those nozzles can be adjusted using the method according to this embodiment.

Figure 24:
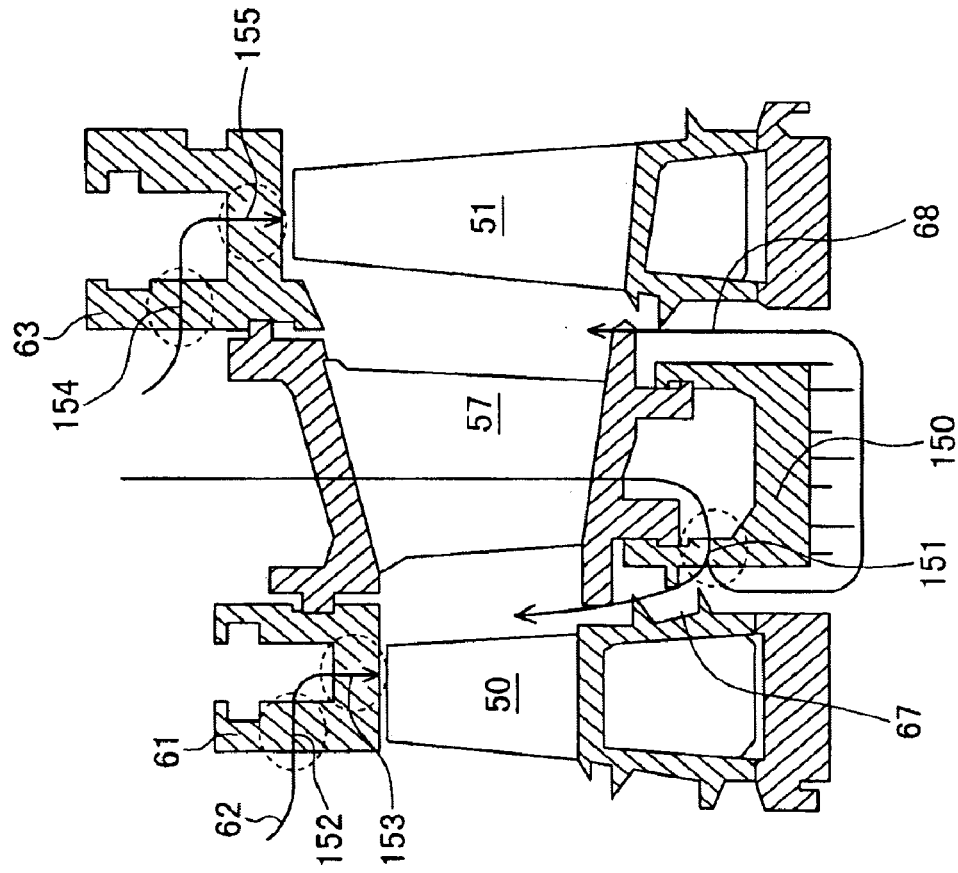
FIG. 24 shows cooling air flow passages led to wheel spaces, a first-stage shroud, and a second-stage shroud.

FIG. 24 shows air introducing routes led to the wheel spaces 67, 68 shown in FIG. 11, and flow passages of cooling air supplied to the first-stage shroud 61 and the second-stage shroud 63. The air introduced to the wheel spaces 67, 68 is supplied through the pipe 60 and then introduced to a cavity of a diaphragm 150 after passing the second-stage nozzle 57. The air introduced to the cavity is supplied to the wheel space 67 through a hole 151 formed in the diaphragm 150 on the first-stage bucket side, and is then forwarded into a main stream gas. A part of the air supplied to the wheel space 67 is supplied to the wheel space 68 after passing the inner side of the diaphragm 150, and is then forwarded into the main stream gas. The first-stage shroud 61 is cooled by supplying a part 62 of the compressed air filled in the combustion casing chamber to a hole 152 formed in a shroud front wall and then to a cooling hole 153 formed to face the main stream gas. The supplied air is forwarded into the main stream gas after the cooling. The second-stage shroud 63 is cooled by supplying a part of the air supplied through the pipe 60, shown in FIG. 11, to a hole 154 formed in a shroud front wall and then to a cooling hole 155 formed to face the main stream gas. The supplied air is forwarded into the main stream gas after the cooling.

When the gas turbine is modified from the simple cycle to the combined cycle and the high-moisture gas turbine cycle, the combustion temperature is increased. This leads to necessity of increasing the flow rate of the air supplied to the wheel spaces 67, 68, or increasing the flow rate of the air for cooling the shrouds. The necessity is adaptable by increasing the number of the holes 151, 152, 153, 154 and 155 or enlarging their diameters. Conversely, when the gas turbine is modified from the combined cycle and the high-moisture gas turbine cycle to the simple cycle, the modification is adaptable by lessening the number of the holes 151, 152, 153, 154 and 155 or reducing their diameters contrary to the above-described case.

FIG. 25 shows another example of a casing cooling system. Referring to FIG. 25, orifices 161, 162 and 163 are provided in the air extraction pipes 60, 74 extended from the intermediate stage of the compressor. The air introduced through the pipes 60, 74 is supplied for cooling the second-stage nozzle 57, the third-stage nozzle 58, the second-stage shroud 63, the third-stage shroud 64, and the wheel spaces 67, 68, 69, 70, 71 and 72. When the gas turbine is modified from the simple cycle to the combined cycle and the high-moisture gas turbine cycle, the combustion temperature during the operation of the gas turbine is increased. This leads to necessity of increasing the flow rate of the air supplied to the nozzles, the shrouds, and the wheel spaces. The necessity is adaptable by enlarging the diameters of the orifices 161, 162 and 163 provided in the pipes 60, 74. Conversely, when the gas turbine is modified from the combined cycle and the high-moisture gas turbine cycle to the simple cycle, the modification is adaptable by reducing the diameters of the orifices 161, 162 and 163. Because the flow rate of the supplied air is adjusted in the pipes externally of the casing, the adjustment can be easily performed. Further, even when the operation of the gas turbine is switched over between the simple cycle and the combined cycle after start of the operation, the flow rate of the supplied air can be adjusted without disassembling a body of the gas turbine. A similar advantage can also be obtained by installing valves instead of the orifices 161, 162 and 163.

Figure 26:
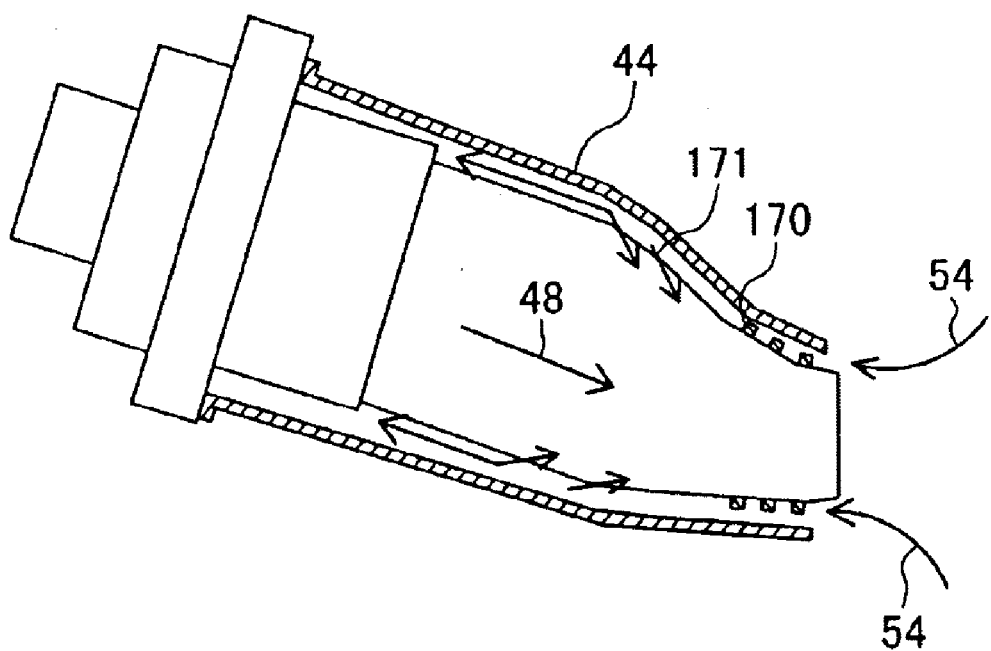
FIG. 26 shows air flow passages in a combustion.

FIG. 26 shows air flows within the combustion shown in FIG. 11. The flow sleeve 45 is of a double-wall tubular structure. The combustion gas 48 passes through the interior of a double-wall tube, and the air 54 for combustion passes through a space outside an inner tube in surrounding relation to the combustion gas 48. For the purpose of cooling the inner tube of the flow sleeve 45, turbulence promoting ribs 170 are provided around the inner tube and/or cooling holes 171 are formed in the inner tube to leak a part of the air 54 for combustion therethrough. When the gas turbine is modified from the simple cycle to the combined cycle and the high-moisture gas turbine cycle, the combustion temperature is increased. A resulting increase in the temperature of the inner tube can be suppressed by increasing the number of the turbulence promoting ribs 170 and/or the holes 171. Conversely, when the gas turbine is modified from the combined cycle and the high-moisture gas turbine cycle to the simple cycle, the modification is adaptable by lessening the number of the turbulence promoting ribs 170 or, if necessary, eliminating the turbulence promoting ribs 170. Also, the flow rate of the cooling air can be reduced by lessening the number of the holes 171.

With the above-described second embodiment of the present invention, it is possible to suppress the production cost of the gas turbine and to shorten a time required for the production.

According to the present invention, as described above, a production process of a gas turbine capable of being applied to various cycles can be provided.

What is claimed is:

1. A gas turbine comprising a multistage compressor and a multistage turbine, wherein a principal part comprising said compressor and said turbine is initially designed to be used in common for various thermodynamic cycles, said compressor or said turbine each being made by combining a number of stages for a specific thermodynamic cycle with at least one disk shaped member having an outer periphery that forms part of an inner peripheral wall of an annular flow passage of said compressor or said turbine, the number of either the compressor or the turbine stages being less than the initial design number; and wherein said member replaces each stage omitted to reduce the number of initial stages of said compressor or said turbine, for the gas turbine to operate according to said specific thermodynamic cycle.

2. A gas turbine according to claim 1, wherein said member is a dummy disk which has an outer periphery formed smooth and is capable of being inserted in a disk mount position of said compressor or said turbine.

3. A process of making a gas turbine comprising the steps of:

Initially designing a principal part of a gas turbine including a multistage compressor and a multistage turbine, said principal part capable of being used for various thermodynamic cycles;

Setting for said principal part the number of stages of said compressor and said turbine that can operate a specific thermodynamic cycle, the number of either the compressor or the turbine stages being less than the initial design number;

Wherein a member having an outer periphery, that forms an inner peripheral wall of an annular flow passage of said compressor or said turbine replaces each compressor or turbine stage omitted from principal part such that said gas turbine operates according to said specific thermodynamic cycle; and Making the principal part with the set number of compressor and turbine stages and said member.

4. A process of making a gas turbine according to claim 3, wherein the number of stages of said compressor, the number of stages of said turbine, and a combination of said compressor and said turbine are set based on pressure ratios of said compressor and said turbine which provide a turbine outlet temperature required for the desired cycle, and on a compressor inlet area which provides a required turbine flow rate and a required compressor flow rate.

* * * * *